United States Patent
Pigoski, II et al.

(10) Patent No.: US 10,200,411 B1
(45) Date of Patent: Feb. 5, 2019

(54) METHOD AND SYSTEM FOR PROVIDING INSTANCE RE-STACKING AND SECURITY RATINGS DATA TO IDENTIFY AND EVALUATE RE-STACKING POLICIES IN A CLOUD COMPUTING ENVIRONMENT

(71) Applicant: Intuit Inc., Mountain View, CA (US)

(72) Inventors: Thomas M. Pigoski, II, San Francisco, CA (US); Theresa M. Dayog, Sunnyvale, CA (US); Edward L. Farmer, San Jose, CA (US); Rajan Bansal, Fremont, CA (US); Mark Richard Friberg, Sparks, NV (US)

(73) Assignee: Intuit Inc., Mountain View, CA (US)

( * ) Notice: Subject to any disclaimer, the term of this patent is extended or adjusted under 35 U.S.C. 154(b) by 130 days.

(21) Appl. No.: 15/413,794

(22) Filed: Jan. 24, 2017

(51) Int. Cl.
  *G06F 9/455* (2018.01)
  *H04L 29/06* (2006.01)

(52) U.S. Cl.
  CPC .............. *H04L 63/20* (2013.01); *G06F 9/455* (2013.01); *H04L 63/1433* (2013.01)

(58) Field of Classification Search
  CPC ........ G06F 21/10; G06F 21/556; G06F 21/62; G06F 2221/2119; H04L 63/0428; H04L 67/1097; H04L 63/102
  See application file for complete search history.

(56) References Cited

U.S. PATENT DOCUMENTS

| | | | | |
|---|---|---|---|---|
| 6,604,093 | B1* | 8/2003 | Etzion | G06F 17/30407 706/45 |
| 7,933,794 | B2* | 4/2011 | Adi | G06Q 10/06 705/300 |
| 9,128,739 | B1* | 9/2015 | Juels | G06F 9/45533 |
| 2006/0155719 | A1* | 7/2006 | Mihaeli | G06F 17/30587 |
| 2012/0222084 | A1* | 8/2012 | Beaty | H04L 43/0817 726/1 |
| 2014/0149591 | A1* | 5/2014 | Bhattacharya | H04L 67/1097 709/226 |
| 2017/0116327 | A1* | 4/2017 | Gorelick | G06F 17/30684 |
| 2017/0168797 | A1* | 6/2017 | Pogrebinsky | G06F 8/65 |
| 2018/0048522 | A1* | 2/2018 | Pan | H04L 29/08 |
| 2018/0150356 | A1* | 5/2018 | Boshev | G06F 11/142 |
| 2018/0159747 | A1* | 6/2018 | Chang | H04L 67/10 |

* cited by examiner

*Primary Examiner* — Farid Homayounmehr
*Assistant Examiner* — Sanchit K Sarker
(74) *Attorney, Agent, or Firm* — Hawley Troxell Ennis & Hawley LLP; Philip McKay

(57) ABSTRACT

A re-stacking and security vulnerability data display is generated that includes individual graphic representations of instances (virtual computing systems) used to provide a software application in a cloud computing environment. The re-stacking and security vulnerability data display shows a launch date for each instance, a termination date for the instance, an indication of an instance vulnerability score assigned to the instance, and the base instance creation template release dates for each of the base instance creation templates. Consequently, the re-stacking policy and security vulnerabilities associated with that re-stacking policy for an account can be readily determined by a simple examination of the re-stacking and security vulnerability data display. As a result, any potential security issues and vulnerabilities can be readily identified and addressed.

48 Claims, 6 Drawing Sheets

METHOD AND SYSTEM FOR PROVIDING INSTANCE RE-STACKING AND SECURITY RATINGS DATA TO IDENTIFY AND EVALUATE RE-STACKING POLICIES IN A CLOUD COMPUTING ENVIRONMENT

BACKGROUND

As more and more applications, services, and data have moved to cloud computing models, security of data and accounts has become a paramount issue and significant challenge requiring new and unique solutions and policies.

As a specific example, in traditional computing environments, e.g., non-cloud computing environments, when a security vulnerability, or other software application feature, needed to be addressed or upgraded, additional code, known as a "patch," was provided to the physical hardware-based computing system, i.e. server, providing the software application and this patch code was then incorporated in the software running on the hardware computing system. This type of "fix" was acceptable, and efficient, in a hardware-based server environment where the replacement of the hardware computing system server itself was not an economically viable option.

However, in a cloud computing environment, the "computing systems/servers" are actually virtual machines, known as instances, which are not themselves hardware systems but are instead software-based entities which operate like traditional physical hardware-based computing systems/servers.

One of the many advantages associated with virtual machine instances of computing system/servers is that these instances can be generated and terminated at will without the need for replacing physical hardware. Consequently, when a new software vulnerability solution, or other fix is required, instead of implementing a patch on a physical hardware system, as was done traditionally to repair a vulnerability or provide a fix, the entire virtual computing system/server instance can be terminated and new computing system/server instances can be generated or "spun up" to replace the terminated instances, with the new instances being based on, or running, the updated repaired or fixed software.

In particular, a given computing system/server virtual machine instance, hereafter referred to as simply an "instance," is typically created in a cloud computing environment using an instance creation template. As used herein, the term "instance creation template" is used to denote a special type of virtual appliance that is used to create a virtual machine (instance) within a cloud computing environment. A specific illustrative example of an instance creation template is an Amazon Machine Image (AMI). An AMI is a special type of instance creation template that is a virtual appliance used to create a virtual machine within the Amazon Elastic Compute Cloud ("EC2"). An AMI serves as the basic unit of deployment for services delivered using EC2.

As noted above, in a cloud computing environment, one way to correct a vulnerability, or otherwise update or correct, a system/application is to issue a new instance creation template which incorporates the desired change/fix. In an AWS environment, this means issuing new or updated AMIs. Consequently, in a cloud computing environment, whenever a new instance creation template, referred to herein as a new base instance creation template, is generated and made available, it is highly desirable that all instances associated with an account or application that were created using previously generated base instance creation templates be terminated and new instances, based on the new instance creation template, be created/launched to replace the old instances based on the old instance creation template. Then the instances based on the new instance creation template can be used to service the account and implement and/or offer the application associated with the account.

The process of terminating old instances associated with a given account or application and replacing those instances with new instances is referred to herein as "re-stacking."

As can be seen from the discussion above, the re-stacking of instances associated with a given account or application, and policies associated with the re-stacking of instances, is a significant indicator of the overall security and efficiency of the account and associated application. Indeed, were an account holder, application provider, or cloud computing system environment provider given the capability to easily identify and evaluate the re-stacking policies associated with a given account and application, then significant information regarding the security of the account, application, and even the entire cloud computing environment, could be readily recognized.

However, the mere act of re-stacking of instances associated with a given account or application does not necessarily ensure that security vulnerabilities are eliminated, or even reduced. This is because, individual instances, even newly re-stacked instances, are only as secure as the actual instance creation template/AMI upon which they are based. In short, if instance creation templates/AMIs with security vulnerabilities are used as new base re-stack instance creation templates/AMIs, then the re-stack can result in no reduction in security vulnerabilities, and even potentially in new, or more, security vulnerabilities being introduced. Likewise, if old base instance creation templates/AMIs are relatively secure, i.e., have few, or no security vulnerabilities, then the use of these "outdated" instance creation templates/AMIs for re-stacking may result in no additional security vulnerabilities being introduced.

The situation is made even more complicated by the fact that a given account holder/application provider may generate and implement their own customized instance creation templates/AMIs. While these customized instance creation templates/AMIs typically represent only minor changes made to base instance creation templates/AMIs, they can include potential security vulnerabilities not necessarily present in the instance creation templates/AMIs. In short, the customized instance creation templates/AMIs can introduce customized security vulnerabilities. Consequently, these customized instance creation templates/AMIs further complicate any attempt at security vulnerability analysis.

Therefore, despite the value of an efficient and effective visualization of re-stacking policies associated with a given account, and the value of determining the security vulnerability of instance creation templates used in the re-stacking process, there is currently no mechanism or system available to effectively and efficiently identify and evaluate the re-stacking policies associated with a given account or application or the security vulnerability of the re-stacking policies used. This is largely due to the fact that many account holders, application providers, and cloud computing system providers have yet to fully recognize the significance of re-stacking policy analysis and that the amounts of data that must be analyzed for even a modest account or application offering is potentially overwhelming. Consequently, there is currently no algorithm or process for obtaining this re-stacking data and instance creation template security vulnerability data, much less processing it in a manner that produces a useful analysis tool.

Therefore, there is a long standing technical need in the cloud computing arts for providing a method and system to identify and evaluate re-stacking policies and the security vulnerabilities associated with those re-stacking policies.

SUMMARY

In accordance with one embodiment, a re-stacking and security vulnerability data display is generated that includes individual graphic representations of instances (virtual computing systems/servers) associated with an account and used to service the account, e.g., provide a software application, in a cloud computing environment. In one embodiment, the re-stacking and security vulnerability data display shows a listing of instances associated with a specific account/application in the cloud computing environment. For each listed instance, a launch date for the instance, a termination date for the instance, the base instance creation template release dates for each of the base instance creation templates associated with the application, and a visual representation of the security vulnerability rating for the instance, are displayed in a single re-stacking and security vulnerability data display. As a result, the re-stacking policy and the resulting security vulnerability of the re-stacking policy associated with an account/software application offering can be readily determined by a simple examination of the re-stacking and security vulnerability data display and any potential security issues and vulnerabilities can be readily identified and addressed.

Consequently, disclosed herein is a technical solution to the long standing technical need in the cloud computing arts for providing a method and system to identify and evaluate re-stacking policies and the security vulnerabilities associated with those re-stacking policies.

In accordance with one embodiment, a method for providing instance re-stacking and security ratings data to identify and evaluate re-stacking policies in a cloud computing environment includes obtaining access to historical instance operational data associated with one or more instances operating in a cloud computing environment. In one embodiment, each of the one or more instances is created using one of one or more instance creation templates. In one embodiment, each of the one or more instances is implemented in connection with an account and/or application being offered by an application provider through the cloud computing environment.

In accordance with one embodiment, an instance creation template of the one of one or more instance creation templates used to create each of the one or more instances is determined. In one embodiment, instance creation template data is then generated for each of the one or more instances indicating the instance creation template used to generate each instance of the one or more instances. In one embodiment, the instance creation template data for each instance is then associated with that instance.

In one embodiment, each instance creation template is analyzed and tested to determine security vulnerabilities associated with that instance creation template and instances launched based on the instance creation template. In one embodiment, an instance creation template security vulnerability score or grade is assigned to each instance creation template based, at least in part, on the analysis and testing of the instance creation template. In one embodiment, instance creation template security vulnerability score data is then generated for each instance creation template and the instance creation template security vulnerability score data for each instance creation template is assigned to, and associated with/correlated to, each instance generated based on that instance creation template.

In accordance with one embodiment, the instance operational data associated with each of the one or more instances associated with the account/application is analyzed and processed to generate instance lifespan and security vulnerability data for that instance. In one embodiment, the instance lifespan and security vulnerability data indicates a launch date of the instance and a termination date for the instance.

In accordance with one embodiment, instance lifespan and security vulnerability data is generated for each of the one or more instances including data for generating an instance lifespan and security vulnerability graphic. In one embodiment, the instance lifespan and security vulnerability graphic includes an individual graphic representation of each of the one or more instances. In one embodiment, the graphic representation of each of the one or more instances indicates a launch date of the instance, a termination date for the instance, and an indication of the security vulnerability rating or grade assigned to the instance.

In accordance with one embodiment, access to base instance creation template release date data indicating a release date for each base instance creation template associated with the one or more instances is obtained. In one embodiment, the base instance creation template release date data is used to indicate base instance creation template release dates for each of the instance creation templates used to create the one or more instances in the instance lifespan and security vulnerability graphic. In this way, in one embodiment, the instance lifespan and security vulnerability graphic is transformed into a re-stacking and security vulnerability data graphic.

In accordance with one embodiment, the re-stacking and security vulnerability data graphic includes an individual graphic representation of each of the one or more instances associated with the account/application indicating a launch date for the instance, a termination date for the instance, an indication of a security vulnerability rating or grade assigned to the instance, and the base instance creation template release dates for each of the base instance creation templates.

In accordance with one embodiment, the re-stacking and security vulnerability data graphic is then evaluated and provided to one or more parties.

The disclosed embodiments provide an efficient, effective, and highly adaptable solution to the long standing technical need in the cloud computing environment for providing a method and system to identify and evaluate re-stacking policies and the security vulnerabilities associated with those re-stacking policies. However, the disclosed method and system for providing instance re-stacking and security ratings data to identify and evaluate re-stacking policies in a cloud computing environment does not encompass, embody, or preclude other forms of innovation in the area of cloud computing security and re-stacking analysis.

In addition, the disclosed method and system for providing instance re-stacking and security ratings data to identify and evaluate re-stacking policies in a cloud computing environment is not related to any fundamental economic practice, fundamental data processing practice, mental steps, or pen and paper based solution. In fact, the disclosed embodiments are directed to providing solutions to relatively new problems associated with cloud computing, re-stacking, cloud vulnerability analysis, and the processing and visualization of large amounts of data, i.e., "big data." Consequently, the disclosed method and system for providing instance re-stacking and security ratings data to identify and evaluate re-stacking policies in a cloud computing environment is not directed to, does not encompass, and is not merely, an abstract idea or concept.

In addition, the disclosed method and system for providing instance re-stacking and security ratings data to identify and evaluate re-stacking policies in a cloud computing environment provides for significant improvements to the technical fields of cloud computing, data security, vulnerability management, and software application implementation.

In addition, by allowing for a simple visual analysis of re-stacking policies, and the security vulnerabilities associated with those re-stacking policies, the disclosed method and system for providing instance re-stacking and security ratings data to identify and evaluate re-stacking policies in a cloud computing environment provides for a more rapid response to security issues and application vulnerabilities, as well as fewer requests for data, data transfers, and data analysis.

Consequently, use of the disclosed method and system for providing instance re-stacking and security ratings data to identify and evaluate re-stacking policies in a cloud computing environment results in more efficient use of human and non-human resources, fewer processor cycles being utilized, reduced memory utilization, and less communications bandwidth being utilized to relay data to, and from, backend systems and client systems. As a result, computing systems are transformed into faster, more efficient, and more effective computing systems by implementing the method and system for providing instance re-stacking and security ratings data to identify and evaluate re-stacking policies in a cloud computing environment.

Figure 1:
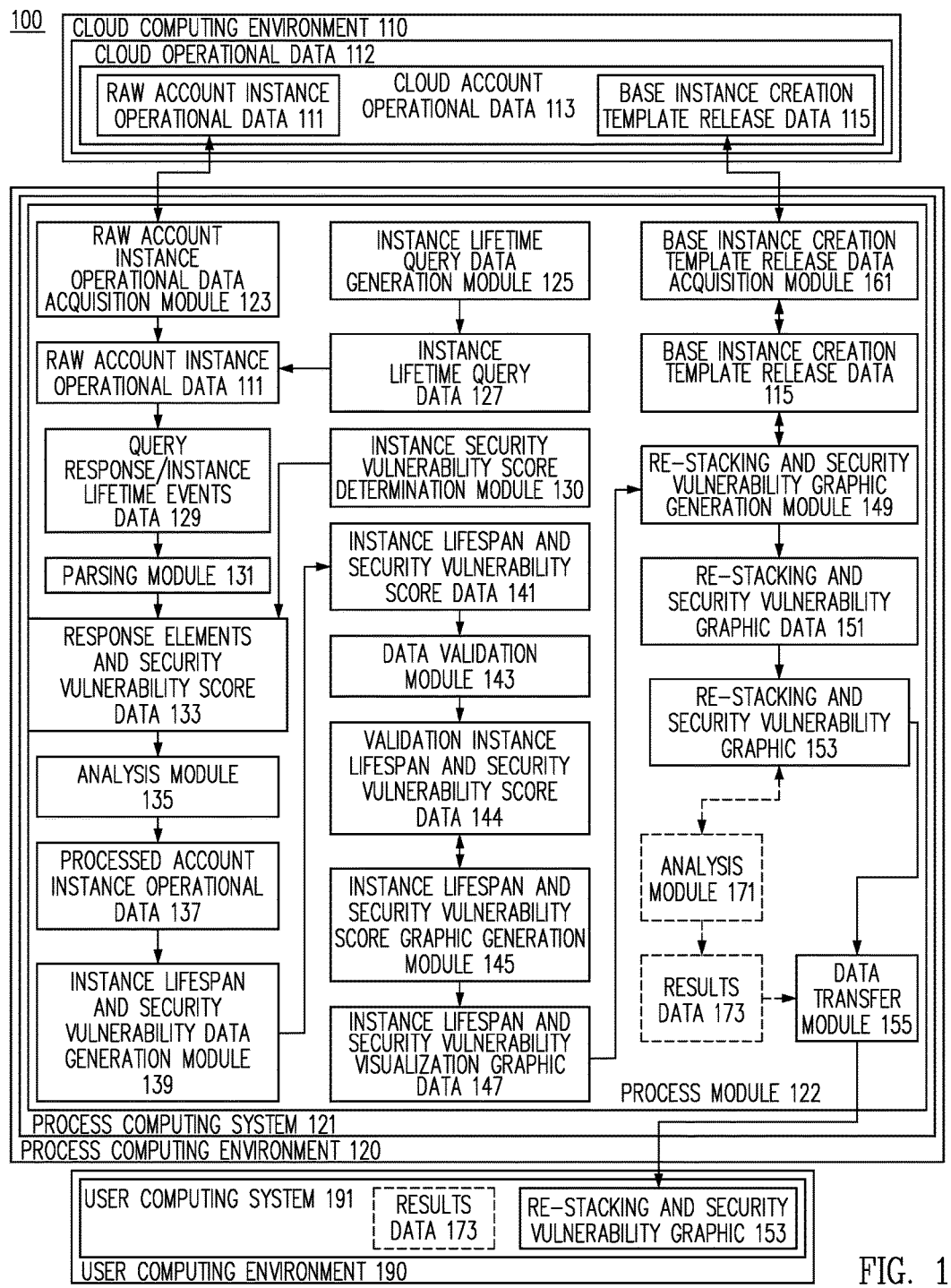
FIG. 1 is a high-level and functionality-based block diagram of a hardware and production environment for providing instance re-stacking and security ratings data to identify and evaluate re-stacking policies in a cloud computing environment, in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

TERM DEFINITIONS

Herein, the terms "application," "software system," and "software application" are used interchangeably and can be, but are not limited to: any data management system implemented and/or accessed, in whole or in part, in a cloud computing environment, on a computing system, accessed through one or more servers, accessed through a network, and/or otherwise accessed through a network; implemented and/or accessed, in whole or in part, on a computing system, desktop system, mobile system, and/or wearable device as provided through any system or by any mechanism and/or process, as discussed herein, and/or as known in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/ communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

Herein, the term "party," "user," "user consumer," and "customer" are used interchangeably to denote any party and/or entity that interfaces with, and/or to whom information is provided by, the method and system for providing instance re-stacking and security ratings data to identify and evaluate re-stacking policies in a cloud computing environment described herein, and/or a person and/or entity that interfaces with, and/or to whom information is provided by, the method and system for providing instance re-stacking and security ratings data to identify and evaluate re-stacking policies in a cloud computing environment described herein, and/or a legal guardian of person and/or entity that interfaces with, and/or to whom information is provided by, the method and system for providing instance re-stacking and security ratings data to identify and evaluate re-stacking policies in a cloud computing environment described herein, and/or an authorized agent of any party and/or person and/or entity that interfaces with, and/or to whom information is provided by, the method and system for providing instance re-stacking and security ratings data to identify and evaluate re-stacking policies in a cloud computing environment described herein. For instance, in various embodiments, a user can be, but is not limited to, a person, a commercial entity, an application, a service, and/or a computing system.

As used herein, the term "instance creation template" is used to denote a special type of virtual appliance that is used to create a virtual machine (instance) within a cloud computing environment. A specific illustrative example of an instance creation template is an Amazon Machine Image (AMI).

As used herein, the term "Amazon Machine Image (AMI)" is used to denote a special type of instance creation template that is a virtual appliance used to create a virtual machine within the Amazon Elastic Compute Cloud ("EC2"). An AMI serves as the basic unit of deployment for services delivered using EC2.

As used herein, the term Relational Database Service (RDS) denotes a service for setting up, operating, and scaling a relational database in the cloud. One specific illustrative example of an RDS is the Amazon Relational Database Service (Amazon RDS) which is a web service that makes it easier to set up, operate, and scale a relational database in the cloud, provides resizable capacity for an industry-standard relational database, and manages common database administration tasks.

As used herein, the term "re-stacking" refers to the practice of terminating one or more instances associated with an application or client in a cloud computing environment and then activating new "replacement" instances associated with the application or client in a cloud computing environment. There are multiple reasons and occasions making re-stacking desirable. One specific illustrative example of a reason to perform a re-stacking operation is to terminate instances built on an old instance creation template, such as an old base AMI, and bring up replacement instances based on a new instance creation template, such as a new base AMI. This is particularly desirable when the new base instance creation template is released to fix vulnerabilities discovered in the old instance creation template.

DETAILED DISCLOSURE

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a re-stacking and security vulnerability data display is generated that includes individual graphic representations of instances (virtual computing systems/servers) associated with an account and used to service the account, e.g., provide a software application, in a cloud computing environment. In one embodiment, the re-stacking and security vulnerability data display shows a listing of instances associated with a specific account/application in the cloud computing environment. For each listed instance, a launch date for the instance, a termination date for the instance, the base instance creation template release dates for each of the base instance creation templates associated with the application, and a visual representation of the security vulnerability rating for the instance, are displayed in a single re-stacking and security vulnerability data display. As a result, the re-stacking policy and the resulting security vulnerability of the re-stacking policy associated with an account/software application offering can be readily determined by a simple examination of the re-stacking and security vulnerability data display and any potential security issues and vulnerabilities can be readily identified and addressed.

Consequently, disclosed herein is a technical solution to the long standing technical need in the cloud computing arts for providing an easy to understand visualization of re-stacking policies and the security vulnerabilities associated with those re-stacking policies, to identify and evaluate re-stacking policies.

In accordance with one embodiment, a method for providing instance re-stacking and security ratings data to identify and evaluate re-stacking policies in a cloud computing environment includes obtaining access to historical instance operational data associated with one or more instances operating in a cloud computing environment.

In one embodiment, each of the one or more instances is created using one of one or more instance creation templates. As noted above, instance creation templates include a special type of virtual appliance that is used to create a virtual machine (instance) within a cloud computing environment. A specific illustrative example of an instance creation template is an Amazon Machine Image (AMI). As also noted above, an AMI is a special type of instance creation template used to create a virtual machine within the Amazon Web Services cloud computing environment, and, in particular, in the Amazon Elastic Compute Cloud ("EC2"). An AMI serves as the basic unit of deployment for services delivered using EC2.

In one embodiment, each of the one or more instances is implemented in connection with a given account to service that account, and/or implement an application being offered by an account owner/application provider through the cloud computing environment.

In accordance with one embodiment, an instance creation template of the one of one or more instance creation templates used to create each of the one or more instances is determined. In one embodiment, instance creation template data is then generated for each of the one or more instances indicating the instance creation template used to generate each instance of the one or more instances. In one embodiment, the instance creation template data for each instance is then associated with that instance.

In one embodiment, each instance creation template is analyzed and tested to determine security vulnerabilities associated with that instance creation template and instances launched based on the instance creation template. In one embodiment, an instance creation template security vulnerability score or grade is assigned to each instance creation template based, at least in part, on the analysis and testing of the instance creation template.

In one embodiment, instance creation template security vulnerability score data is then generated for each instance creation template and the instance creation template security vulnerability score data for each instance creation template is associated with/correlated to, each instance creation template.

In one embodiment, the instance lifespan and security vulnerability algorithm includes first obtaining raw instance operational data associated with a given account/application in a cloud computing environment, also referred to herein as raw account instance operational data. In one embodiment, the raw instance operational data is obtained from an AWS computing environment using a Relational Database Service (RDS), such as, but not limited to, the Amazon Relational Database Service and the Amazon Cloud Trail Service.

In one embodiment, once access to the raw instance operational data is obtained, an instance lifespan query is generated to identify lifespan events associated with the instances. In one embodiment, the instance lifespan query includes requests for one or more of the following: run dates for the instances, termination dates for the instances, start times for the instances, and stop times for the instances.

In one embodiment, in response to the instance lifespan query, instance events data representing a list of events associated with the instances is generated and provided. In one embodiment, the instance events data is then parsed to determine one or more of: the account identification associated with each of the instances, the user, the event name, and the event time.

In one embodiment, response elements data is then generated that includes, for each instance, the instance creation template data for each of the one or more instances, e.g., the instance image data, indicating which instance creation template was used to generate each instance of the one or more instances. In one embodiment, the instance creation template data for each instance is associated with that instance.

In one embodiment, the instance creation template data includes image data indicating the instance creation template/AMI identification for the instance creation template/AMI used to create the instance, the launch time of the instance, and the termination time associated with the instance.

In one embodiment, for each instance, the instance creation template security vulnerability score data associated with the instance creation template used to create that instance is designated instance security vulnerability score data for that instance and the instance security vulnerability score data for each instance is associated with/correlated to, and assigned to, the instance.

In accordance with one embodiment, the response elements data, including the instance security vulnerability score data for each instance, is then stored in collections of maps, lists, and sets. In accordance with one embodiment, the response elements data is then analyzed to generate processed instance operational data associated with each of the one or more instances. In one embodiment, the generation of the processed instance operational data includes the creation of instance lifespan objects and the instance events indicated are reduced to instance identification data, the associated instance creation template/AMI data for each instance, the start time of each instance, the end time of each instance, and the instance security vulnerability score data for that instance.

In one embodiment, the processed instance operational data is then organized and processed to generate instance lifespan and security vulnerability data for each instance. In one embodiment, the instance lifespan and security vulnerability data for each instance is then validated using one or more data validation methods, such as any data validation methods discussed herein, known at the time of filing, or as developed after filing.

In one embodiment, the instance lifespan and security vulnerability data is used to generate instance lifespan and security vulnerability data for each of the one or more instances including data for generating an instance lifespan and security vulnerability graphic.

In one embodiment, the instance lifespan and security vulnerability graphic includes individual graphic representations of each of the one or more instances. In one embodiment, the graphic representation of each of the one or more instances indicates a launch date of the instance, a termination date for the instance, and an indication of the security vulnerability rating or grade assigned to the instance.

In accordance with one embodiment, access to base instance creation template release date data indicating a release date for each base instance creation template associated with the one or more instances is obtained. In one embodiment, the base instance creation template release date data is used to indicate base instance creation template release dates for each of the instance creation templates used to create the one or more instances in the instance lifespan and security vulnerability graphic. In this way, in one embodiment, the instance lifespan and security vulnerability graphic is transformed into a re-stacking and security vulnerability data graphic.

In accordance with one embodiment, the re-stacking and security vulnerability data graphic includes an individual graphic representation of each of the one or more instances indicating a launch date for the instance, a termination date for the instance, an indication of the security vulnerability rating or grade assigned to the instance, and the base instance creation template release dates for each of the base instance creation templates.

In accordance with one embodiment, the re-stacking and security vulnerability data graphic is evaluated and provided to one or more parties. In accordance with one embodiment, one or both of the re-stacking and security vulnerability data graphic and the re-stacking and security vulnerability data graphic data is further analyzed to identify security vulnerabilities and re-stacking policy analysis and results data is generated. In one embodiment, the account owner/provider of the software application is provided the re-stacking analysis and results data and/or is informed of the analysis results.

FIG. 1 is a high-level functionality-based block diagram of a hardware and production environment 100 for providing instance re-stacking and security ratings data to identify and evaluate re-stacking policies in a cloud computing environment, in accordance with one embodiment.

As seen in FIG. 1, in this specific illustrative example, production environment 100 includes: CLOUD COMPUTING ENVIRONMENT 110; PROCESS COMPUTING ENVIRONMENT 120, including PROCESS COMPUTING SYSTEM 121, and USER COMPUTING ENVIRONMENT 190, including USER COMPUTING SYSTEM 191.

As seen in FIG. 1, CLOUD COMPUTING ENVIRONMENT 110 includes CLOUD OPERATIONAL DATA 112 and CLOUD ACCOUNT OPERATIONAL DATA 113. In one embodiment, CLOUD OPERATIONAL DATA 112 includes historical operational data associated with all of CLOUD COMPUTING ENVIRONMENT 110 and CLOUD ACCOUNT OPERATIONAL DATA 113 includes historical operational data associated with one or more instances operating in a CLOUD COMPUTING ENVIRONMENT 110 that are used to service an account.

In one embodiment, each of the one or more instances indicated in CLOUD ACCOUNT OPERATIONAL DATA 113 is created using one of one or more instance creation templates. As noted above, instance creation templates include a special type of virtual appliance that is used to create a virtual machine (instance) within a cloud computing environment. A specific illustrative example of an instance creation template is an Amazon Machine Image (AMI).

In one embodiment, each of the one or more instances is implemented in connection with a given account to service that account, and/or implement an application being offered by an account owner/application provider through the cloud computing environment.

In one embodiment, and as discussed in more detail below, INSTANCE LIFESPAN AND SECURITY VULNERABILITY SCORE DATA 141 is determined using an instance lifespan and security vulnerability algorithm. In one embodiment, the instance lifespan and security vulnerability algorithm includes first obtaining RAW ACCOUNT INSTANCE OPERATIONAL DATA 111 from CLOUD ACCOUNT OPERATIONAL DATA 113.

In one embodiment, RAW ACCOUNT INSTANCE OPERATIONAL DATA 111 is obtained from an AWS computing environment using a Relational Database Service (RDS), such as, but not limited to, the Amazon Relational Database Service and the Amazon Cloud Trail Service.

In one embodiment, PROCESS COMPUTING SYSTEM 121 includes PROCESS MODULE 122 for implementing the instance lifespan and security vulnerability algorithm. In one embodiment, access to the RAW ACCOUNT INSTANCE OPERATIONAL DATA 111 is obtained by PROCESS MODULE 122 via RAW ACCOUNT INSTANCE OPERATIONAL DATA ACQUISITION MODULE 123.

In one embodiment, INSTANCE LIFESPAN QUERY DATA GENERATION MODULE 125 generates INSTANCE LIFESPAN QUERY DATA 127. In one embodiment, the instance lifespan query of INSTANCE LIFESPAN QUERY DATA 127 seeks to identify lifespan events associated with the instances of RAW ACCOUNT INSTANCE OPERATIONAL DATA 111. In one embodiment, the instance lifespan query of INSTANCE LIFESPAN QUERY DATA 127 includes requests for one or more of the following: run dates for the instances, termination dates for the instances, start times for the instances, and stop times for the instances.

In one embodiment, in response to the instance lifespan query of INSTANCE LIFESPAN QUERY DATA 127, QUERY RESPONSE/INSTANCE LIFESPAN EVENTS DATA 129 is generated representing a list of events associated with the instances. In one embodiment, the QUERY RESPONSE/INSTANCE LIFESPAN EVENTS DATA 129 is then parsed by PARSING MODULE 131 to determine one or more of: the account identification associated with each of the instances, the user, the event name, and the event time.

In one embodiment, response data (not shown) is thereby generated that includes, for each instance, the instance creation template data for each of the one or more instances, e.g., the instance image data, indicating which instance creation template was used to generate each instance of the one or more instances. In one embodiment, the instance creation template data for each instance is associated with that instance.

In one embodiment, the instance creation template data includes image data indicating the AMI identification for the AMI used to create the instance, the launch time of the instance, and the termination time associated with the instance.

In accordance with one embodiment, INSTANCE SECURITY VULNERABILITY SCORE DETERMINATION MODULE 130 analyzes the parsed response data (not shown) from PARSING MODULE 131 and each instance creation template included therein to determine a security vulnerability score for each instance creation template. INSTANCE SECURITY VULNERABILITY SCORE DETERMINATION MODULE 130 then assigns the determined instance creation template security vulnerability score to each instance creation template and all instances created using that instance creation template.

In accordance with one embodiment, INSTANCE SECURITY VULNERABILITY SCORE DETERMINATION MODULE 130 analyzes the parsed response data (not shown) from PARSING MODULE 131 to identify the instance creation templates used to create each of the one or more instances.

In one embodiment, INSTANCE SECURITY VULNERABILITY SCORE DETERMINATION MODULE 130 analyzes and tests each of the identified instance creation templates used to create each of the one or more instances In one embodiment, INSTANCE SECURITY VULNERABILITY SCORE DETERMINATION MODULE 130 then assigns an instance creation template security vulnerability score or grade each instance creation template based, at least in part, on the analysis and testing of the instance creation template.

In one embodiment, instance creation template security vulnerability score data is then generated at INSTANCE SECURITY VULNERABILITY SCORE DETERMINATION MODULE 130 for each instance creation template and the instance creation template security vulnerability score data for each instance creation template is associated with/correlated to, and assigned to, each instance creation template and all instances created using that instance creation template.

In one embodiment, INSTANCE SECURITY VULNERABILITY SCORE DETERMINATION MODULE 130 then combines the instance creation template security vulnerability score data for each instance with the parsed response data (not shown) from PARSING MODULE 131 to generate RESPONSE ELEMENTS AND SECURITY VULNERABILITY SCORE DATA 133.

In accordance with one embodiment, RESPONSE ELEMENTS AND SECURITY VULNERABILITY SCORE DATA 133 is stored in collections of maps, lists, and sets (not shown in FIG. 1). In accordance with one embodiment, RESPONSE ELEMENTS AND SECURITY VULNERABILITY SCORE DATA 133 is then analyzed by ANALYSIS MODULE 135 to generate PROCESSED ACCOUNT INSTANCE OPERATIONAL DATA 137 associated with each of the one or more instances. In one embodiment, the generation of PROCESSED ACCOUNT INSTANCE OPERATIONAL DATA 137 includes the creation of instance lifespan objects (not shown in FIG. 1) and the instance events indicated are reduced to instance identification data, the associated AMI creation data for each instance, the start time of each instance, the end time of each instance, and the instance creation template security vulnerability score data for each instance.

In one embodiment, PROCESSED ACCOUNT INSTANCE OPERATIONAL DATA 137 is then organized and processed by INSTANCE LIFESPAN AND SECURITY VULNERABILITY DATA GENERATION MODULE 139 to generate INSTANCE LIFESPAN AND SECURITY VULNERABILITY SCORE DATA 141 for each instance. In one embodiment, INSTANCE LIFESPAN AND SECURITY VULNERABILITY SCORE DATA 141 for each instance is then validated by DATA VALIDATION MODULE 143 using one or more data validation methods, such as any data validation methods discussed herein, known at the time of filing, or as developed after filing, to generate VALIDATED INSTANCE LIFESPAN AND SECURITY VULNERABILITY SCORE DATA 144.

In one embodiment, at INSTANCE LIFESPAN AND SECURITY VULNERABILITY SCORE GRAPHIC GENERATION MODULE 145, VALIDATED INSTANCE LIFESPAN AND SECURITY VULNERABILITY SCORE DATA 144 is used to generate INSTANCE LIFESPAN AND SECURITY VULNERABILITY GRAPHIC DATA 147 for generating an instance lifespan and security vulnerability graphic, such as instance lifespan and security vulnerability graphic 301 of FIG. 3A discussed below. In one embodiment, the instance lifespan and security vulnerability graphic includes individual graphic representations of each of the one or more instances. In one embodiment, the graphic representation of each of the one or more instances indicates a launch date of the instance, a termination date for the instance, and an indication of the security vulnerability score or grade for that instance.

Returning to FIG. 1, in accordance with one embodiment, access to BASE INSTANCE CREATION TEMPLATE RELEASE DATA 115 indicating a release date for each base instance creation template associated with the one or more instances is obtained by BASE INSTANCE CREATION TEMPLATE RELEASE DATA ACQUISITION MODULE 161, in one embodiment, from CLOUD ACCOUNT OPERATIONAL DATA 113.

In one embodiment, INSTANCE LIFESPAN AND SECURITY VULNERABILITY GRAPHIC DATA 147 and BASE INSTANCE CREATION TEMPLATE RELEASE DATA 115 are provided to RE-STACKING AND SECURITY VULNERABILITY GRAPHIC GENERATION MODULE 149 and BASE INSTANCE CREATION TEMPLATE RELEASE DATA 115 is used to indicate base instance creation template release dates for each of the instance creation templates used to create the one or more instances in the instance lifespan and security vulnerability graphic of INSTANCE LIFESPAN AND SECURITY VULNERABILITY GRAPHIC DATA 147. In this way, in one embodiment, INSTANCE LIFESPAN AND SECURITY VULNERABILITY GRAPHIC DATA 147 is transformed into RE-STACKING AND SECURITY VULNERABILITY GRAPHIC DATA 151.

In accordance with one embodiment, RE-STACKING AND SECURITY VULNERABILITY GRAPHIC DATA 151 is used to generate RE-STACKING AND SECURITY VULNERABILITY GRAPHIC 153, such as re-stacking and security vulnerability data graphic 302 of FIG. 3B, discussed below. Returning to FIG. 1, in one embodiment RE-STACKING AND SECURITY VULNERABILITY GRAPHIC 153 includes an individual graphic representation of each of the one or more instances indicating a launch date for the instance, a termination date for the instance, an indication of the instance creation template used to generate that instance, and the base instance creation template release dates for each of the base instance creation templates.

In accordance with one embodiment, RE-STACKING AND SECURITY VULNERABILITY GRAPHIC DATA 151 and/or RE-STACKING AND SECURITY VULNERABILITY GRAPHIC 153 is provided to USER COMPUTING SYSTEM 191 in USER COMPUTING ENVIRONMENT 190 through DATA TRANSFER MODULE 155 and thereby provided to one or more parties.

In accordance with one embodiment, RE-STACKING AND SECURITY VULNERABILITY GRAPHIC DATA 151 and/or RE-STACKING AND SECURITY VULNERABILITY GRAPHIC 153 is/are optionally evaluated by ANALYSIS MODULE 171 to identify security vulnerabilities and RESULTS DATA 173 is generated. In one embodiment, RESULTS DATA 173 is then provided to USER COMPUTING SYSTEM 191 in USER COMPUTING ENVIRONMENT 190 through DATA TRANSFER MODULE 155 and thereby provided to one or more parties.

The disclosed embodiments provide an efficient, effective, and highly adaptable solution to the long standing technical need in the cloud computing environment to provide for visualization of re-stacking policies and the security vulnerabilities associated with those re-stacking policies, to identify and evaluate re-stacking policies. However, the disclosed method and system for providing instance re-stacking and security ratings data to identify and evaluate re-stacking policies in a cloud computing environment does not encompass, embody, or preclude other forms of innovation in the area of cloud computing security or re-stacking analysis.

In addition, the disclosed method and system for providing instance re-stacking and security ratings data to identify and evaluate re-stacking policies in a cloud computing environment is not related to any fundamental economic practice, fundamental data processing practice, mental steps, or pen and paper based solution. In fact, the disclosed embodiments are directed to providing solutions to the relatively new problems associated with cloud computing, re-stacking, cloud vulnerability analysis, and the processing and visualization of large amounts of data, i.e., "big data." Consequently, the disclosed method and system for providing instance re-stacking and security ratings data to identify and evaluate re-stacking policies in a cloud computing environment is not directed to, does not encompass, and is not merely, an abstract idea or concept.

In addition, the disclosed method and system for providing instance re-stacking and security ratings data to identify and evaluate re-stacking policies in a cloud computing environment provides for significant improvements to the technical fields of cloud computing, data security, vulnerability management, and software application implementation.

In addition, by allowing for a simple visual analysis of re-stacking policies, the disclosed method and system for providing instance re-stacking and security ratings data to identify and evaluate re-stacking policies in a cloud computing environment provides for a more rapid response to security issues and application vulnerabilities, as well as fewer requests for data, data transfers, and data analysis.

Consequently, use of the disclosed method and system for providing instance re-stacking and security ratings data to identify and evaluate re-stacking policies in a cloud computing environment results in more efficient use of human and non-human resources, fewer processor cycles being utilized, reduced memory utilization, and less communications bandwidth being utilized to relay data to, and from, backend systems and client systems.

As a result, computing systems are transformed into faster, more efficient, and more effective computing systems by implementing the method and system for providing instance re-stacking and security ratings data to identify and evaluate re-stacking policies in a cloud computing environment.

Process

In accordance with one embodiment, a re-stacking and security vulnerability data display is generated that includes individual graphic representations of instances (virtual computing systems/servers) associated with an account and used to service the account, e.g., provide a software application, in a cloud computing environment. In one embodiment, the re-stacking and security vulnerability data display shows a listing of instances associated with a specific account/application in the cloud computing environment. For each listed instance, a launch date for the instance, a termination date for the instance, the base instance creation template release dates for each of the base instance creation templates associated with the application, and a visual representation of the security vulnerability rating for the instance, are displayed in a single re-stacking and security vulnerability data display. As a result, the re-stacking policy and the resulting security vulnerability of the re-stacking policy associated with an account/software application offering can be readily determined by a simple examination of the re-stacking and security vulnerability data display and any potential security issues and vulnerabilities can be readily identified and addressed.

Consequently, disclosed herein is a technical solution to the long standing technical need in the cloud computing arts for providing insight into re-stacking policies and the security vulnerabilities associated with those re-stacking policies.

Figure 2:
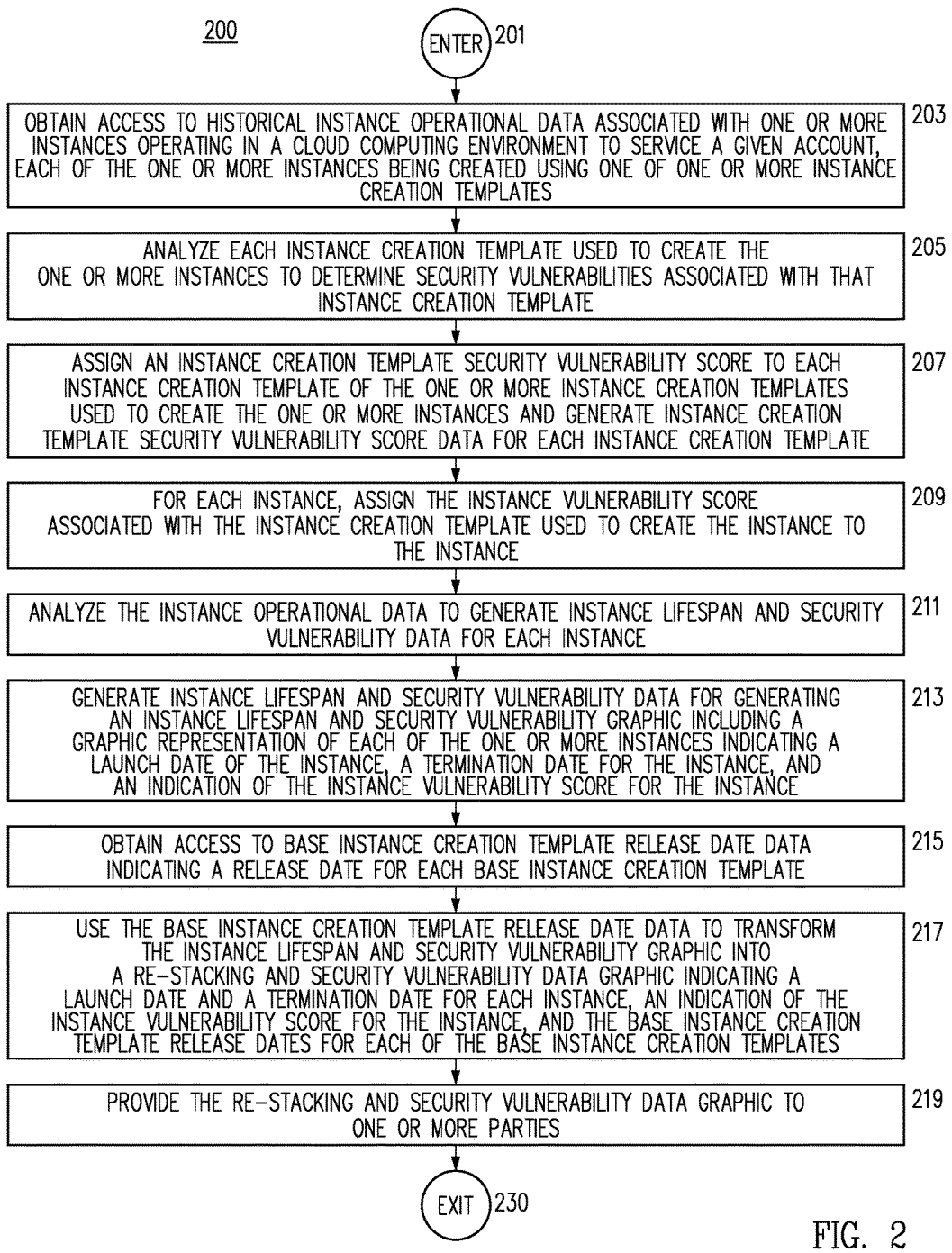
FIG. 2 is a flow chart representing one example of a generalized process for providing instance re-stacking and security ratings data to identify and evaluate re-stacking policies in a cloud computing environment, in accordance with one embodiment.

FIG. 2 is a flow chart representing one example of a generalized process 200 for providing instance re-stacking and security ratings data to identify and evaluate re-stacking policies in a cloud computing environment, in accordance with one embodiment.

In one embodiment, process 200 for providing instance re-stacking and security ratings data to identify and evaluate re-stacking policies in a cloud computing environment begins at ENTER OPERATION 201 and process flow proceeds to OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203.

In one embodiment, at OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203, access to historical instance operational data associated with one or more instances operating in a cloud computing environment is obtained.

In one embodiment, each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203 is created using one of one or more instance creation templates.

As noted above, instance creation templates include a special type of virtual appliance that is used to create a virtual machine (instance) within a cloud computing environment. A specific illustrative example of an instance creation template is an Amazon Machine Image (AMI). As also noted above, an AMI is a special type of instance creation template used to create a virtual machine within the Amazon Web Services cloud computing environment, and, in particular, in the Amazon Elastic Compute Cloud ("EC2"). An AMI serves as the basic unit of deployment for services delivered using EC2.

In one embodiment, each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203 is implemented in connection with a given account to service that account, and/or implement an application being offered by an account owner/application provider through the cloud computing environment.

In one embodiment, at OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203, raw instance operational data is obtained from an AWS computing environment using a Relational Database Service (RDS), such as, but not limited to, the Amazon Relational Database Service and the Amazon Cloud Trail Service.

In one embodiment, once access to historical instance operational data associated with one or more instances operating in a cloud computing environment is obtained at OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203, process flow proceeds to ANALYZE EACH INSTANCE CREATION TEMPLATE USED TO CREATE THE ONE OR MORE INSTANCES TO DETERMINE SECURITY VULNERABILITIES ASSOCIATED WITH THAT INSTANCE CREATION TEMPLATE OPERATION 205.

In accordance with one embodiment, at ANALYZE EACH INSTANCE CREATION TEMPLATE USED TO CREATE THE ONE OR MORE INSTANCES TO DETERMINE SECURITY VULNERABILITIES ASSOCIATED WITH THAT INSTANCE CREATION TEMPLATE OPERATION 205 an instance creation template of one or more instance creation templates used to create each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203 is determined.

In one embodiment, at ANALYZE EACH INSTANCE CREATION TEMPLATE USED TO CREATE THE ONE OR MORE INSTANCES TO DETERMINE SECURITY VULNERABILITIES ASSOCIATED WITH THAT INSTANCE CREATION TEMPLATE OPERATION 205 instance creation template data is generated for each of the one or more instances indicating the instance creation template used to generate each instance of the one or more instances. In one embodiment, at ANALYZE EACH INSTANCE CREATION TEMPLATE USED TO CREATE THE ONE OR MORE INSTANCES TO DETERMINE SECURITY VULNERABILITIES ASSOCIATED WITH THAT INSTANCE CREATION TEMPLATE OPERATION 205 the instance creation template data for each instance is then associated with that instance.

In one embodiment, at ANALYZE EACH INSTANCE CREATION TEMPLATE USED TO CREATE THE ONE OR MORE INSTANCES TO DETERMINE SECURITY VULNERABILITIES ASSOCIATED WITH THAT INSTANCE CREATION TEMPLATE OPERATION 205 the instance creation templates used to create each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203 are analyzed to determine security vulnerabilities of each of the instance creation templates used to create each of the one or more instances.

Various methods and systems for analyzing and testing instance creation templates and instances for security vulnerabilities are known in the art. Consequently, a more detailed description of specific methods and systems for analyzing and testing instance creation templates and instances for security vulnerabilities used at ANALYZE EACH INSTANCE CREATION TEMPLATE USED TO CREATE THE ONE OR MORE INSTANCES TO DETERMINE SECURITY VULNERABILITIES ASSOCIATED WITH THAT INSTANCE CREATION TEMPLATE OPERATION 205 are omitted here to avoid detracting from the invention.

In one embodiment, once each the instance creation templates used to create each of the one or more instances are analyzed to determine security vulnerabilities of each of the instance creation templates at ANALYZE EACH INSTANCE CREATION TEMPLATE USED TO CREATE THE ONE OR MORE INSTANCES TO DETERMINE SECURITY VULNERABILITIES ASSOCIATED WITH THAT INSTANCE CREATION TEMPLATE OPERATION 205, process flow proceeds to ASSIGN AN INSTANCE CREATION TEMPLATE SECURITY VULNERABILITY SCORE TO EACH INSTANCE CREATION TEMPLATE OF THE ONE OR MORE INSTANCE CREATION TEMPLATES USED TO CREATE THE ONE OR MORE INSTANCES AND GENERATE INSTANCE CREATION TEMPLATE SECURITY VULNERABILITY SCORE DATA FOR EACH INSTANCE CREATION TEMPLATE OPERATION 207.

In one embodiment, at ASSIGN AN INSTANCE CREATION TEMPLATE SECURITY VULNERABILITY SCORE TO EACH INSTANCE CREATION TEMPLATE OF THE ONE OR MORE INSTANCE CREATION TEMPLATES USED TO CREATE THE ONE OR MORE INSTANCES AND GENERATE INSTANCE CREATION TEMPLATE SECURITY VULNERABILITY SCORE DATA FOR EACH INSTANCE CREATION TEMPLATE OPERATION 207, based, at least in part, on the analysis of ANALYZE EACH INSTANCE CREATION TEMPLATE USED TO CREATE THE ONE OR MORE INSTANCES TO DETERMINE SECURITY VULNERABILITIES ASSOCIATED WITH THAT INSTANCE CREATION TEMPLATE OPERATION 205, an instance creation template security vulnerability score or grade is assigned to each instance creation template of ANALYZE EACH INSTANCE CREATION TEMPLATE USED TO CREATE THE ONE OR MORE INSTANCES TO DETERMINE SECURITY VULNERABILITIES ASSOCIATED WITH THAT INSTANCE CREATION TEMPLATE OPERATION 205.

In one embodiment, at ASSIGN AN INSTANCE CREATION TEMPLATE SECURITY VULNERABILITY SCORE TO EACH INSTANCE CREATION TEMPLATE OF THE ONE OR MORE INSTANCE CREATION TEMPLATES USED TO CREATE THE ONE OR MORE INSTANCES AND GENERATE INSTANCE CREATION TEMPLATE SECURITY VULNERABILITY SCORE DATA FOR EACH INSTANCE CREATION TEMPLATE OPERATION 207 instance creation template security vulnerability score data is then generated for each instance creation template and the instance creation template security vulnerability score data for each instance creation template is associated with/correlated to, each instance creation template.

In one embodiment, once an instance creation template security vulnerability score or grade is assigned to each instance creation template at ASSIGN AN INSTANCE CREATION TEMPLATE SECURITY VULNERABILITY SCORE TO EACH INSTANCE CREATION TEMPLATE OF THE ONE OR MORE INSTANCE CREATION TEMPLATES USED TO CREATE THE ONE OR MORE INSTANCES AND GENERATE INSTANCE CREATION TEMPLATE SECURITY VULNERABILITY SCORE DATA FOR EACH INSTANCE CREATION TEMPLATE OPERATION 207, process flow proceeds to FOR EACH INSTANCE, ASSIGN THE INSTANCE VULNERABILITY SCORE ASSOCIATED WITH THE INSTANCE CREATION TEMPLATE USED TO CREATE THE INSTANCE TO THE INSTANCE OPERATION 209.

In one embodiment, at FOR EACH INSTANCE, ASSIGN THE INSTANCE VULNERABILITY SCORE ASSOCIATED WITH THE INSTANCE CREATION TEMPLATE USED TO CREATE THE INSTANCE TO THE INSTANCE OPERATION 209 the instance creation template data for each instance of ANALYZE EACH INSTANCE CREATION TEMPLATE USED TO CREATE THE ONE OR MORE INSTANCES TO DETERMINE SECURITY VULNERABILITIES ASSOCIATED WITH THAT INSTANCE CREATION TEMPLATE OPERATION 205 is used to identify the instance creation template used to generate that instance and the instance creation template security vulnerability score data associated with the identified instance creation template of ASSIGN AN INSTANCE CREATION TEMPLATE SECURITY VULNERABILITY SCORE TO EACH INSTANCE CREATION TEMPLATE OF THE ONE OR MORE INSTANCE CREATION TEMPLATES USED TO CREATE THE ONE OR MORE INSTANCES AND GENERATE INSTANCE CREATION TEMPLATE SECURITY VULNERABILITY SCORE DATA FOR EACH INSTANCE CREATION TEMPLATE OPERATION 207 is assigned to that instance.

In one embodiment, once the instance creation template data for each instance is used to identify the instance creation template used to generate that instance and the instance creation template security vulnerability score data associated with the identified instance creation template is assigned to that instance at FOR EACH INSTANCE, ASSIGN THE INSTANCE VULNERABILITY SCORE ASSOCIATED WITH THE INSTANCE CREATION TEMPLATE USED TO CREATE THE INSTANCE TO THE INSTANCE OPERATION 209, process flow proceeds to ANALYZE THE INSTANCE OPERATIONAL DATA TO GENERATE INSTANCE LIFESPAN AND SECURITY VULNERABILITY DATA FOR EACH INSTANCE OPERATION 211.

In one embodiment, at ANALYZE THE INSTANCE OPERATIONAL DATA TO GENERATE INSTANCE LIFESPAN AND SECURITY VULNERABILITY DATA FOR EACH INSTANCE OPERATION 211, instance lifespan and security vulnerability data for each of the instances determined to be associated with the account/application of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203 is determined using an instance lifespan and security vulnerability algorithm.

In one embodiment, once the historical instance operational data is obtained at OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203, an instance lifespan query is generated at ANALYZE THE INSTANCE OPERATIONAL DATA TO GENERATE INSTANCE LIFESPAN AND SECURITY VULNERABILITY DATA FOR EACH INSTANCE OPERATION 211 to identify lifespan events associated with the instances.

In one embodiment, the instance lifespan query of ANALYZE THE INSTANCE OPERATIONAL DATA TO GENERATE INSTANCE LIFESPAN AND SECURITY VULNERABILITY DATA FOR EACH INSTANCE OPERATION 211 includes requests for one or more of the following: run dates for the instances, termination dates for the instances, start times for the instances, and stop times for the instances.

In one embodiment, in response to the instance lifespan query of ANALYZE THE INSTANCE OPERATIONAL DATA TO GENERATE INSTANCE LIFESPAN AND SECURITY VULNERABILITY DATA FOR EACH INSTANCE OPERATION 211, instance events data representing a list of events associated with the instances is generated and provided. In one embodiment, the instance events data is then parsed to determine one or more of: the account identification associated with each of the instances, the user, the event name, and the event time; thereby generating response elements data.

In one embodiment, at ANALYZE THE INSTANCE OPERATIONAL DATA TO GENERATE INSTANCE LIFESPAN AND SECURITY VULNERABILITY DATA FOR EACH INSTANCE OPERATION 211 for each instance, the instance creation template security vulnerability score data associated with the instance creation template used to create that instance of ASSIGN AN INSTANCE CREATION TEMPLATE SECURITY VULNERABILITY SCORE TO EACH INSTANCE CREATION TEMPLATE OF THE ONE OR MORE INSTANCE CREATION TEMPLATES USED TO CREATE THE ONE OR MORE INSTANCES AND GENERATE INSTANCE CREATION TEMPLATE SECURITY VULNERABILITY SCORE DATA FOR EACH INSTANCE CREATION TEMPLATE OPERATION 207 is designated instance security vulnerability score data for that instance and the instance security vulnerability score data for each instance is associated with/correlated to, the instance and included with the response elements data.

In accordance with one embodiment, at ANALYZE THE INSTANCE OPERATIONAL DATA TO GENERATE INSTANCE LIFESPAN AND SECURITY VULNERABILITY DATA FOR EACH INSTANCE OPERATION 211 the response elements data, including the instance security vulnerability score data for each instance, is then stored in collections of maps, lists, and sets. In accordance with one embodiment, the response elements data is then analyzed to generate processed instance operational data associated with each of the one or more instances.

In one embodiment, the generation of the processed instance operational data of ANALYZE THE INSTANCE OPERATIONAL DATA TO GENERATE INSTANCE LIFESPAN AND SECURITY VULNERABILITY DATA FOR EACH INSTANCE OPERATION 211 includes the creation of instance lifespan objects and the instance events indicated are reduced to instance identification data, the associated instance creation template/AMI data for each instance, the start time of each instance, the end time of each instance, and the instance security vulnerability score data for that instance.

In one embodiment, at ANALYZE THE INSTANCE OPERATIONAL DATA TO GENERATE INSTANCE LIFESPAN AND SECURITY VULNERABILITY DATA FOR EACH INSTANCE OPERATION 211 the processed instance operational data is then organized and processed to generate instance lifespan and security vulnerability data for each instance. In one embodiment, the instance lifespan and security vulnerability data for each instance is then validated using one or more data validation methods, such as any data validation methods discussed herein, known at the time of filing, or as developed after filing.

In one embodiment, once instance operational data is obtained and analyzed to generate instance lifespan and security vulnerability data for each of the instances at ANALYZE THE INSTANCE OPERATIONAL DATA TO GENERATE INSTANCE LIFESPAN AND SECURITY VULNERABILITY DATA FOR EACH INSTANCE OPERATION 211, process flow proceeds to GENERATE INSTANCE LIFESPAN AND SECURITY VULNERABILITY DATA FOR GENERATING AN INSTANCE LIFESPAN AND SECURITY VULNERABILITY GRAPHIC INCLUDING A GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE VULNERABILITY SCORE FOR THE INSTANCE OPERATION 213.

In one embodiment, at GENERATE INSTANCE LIFESPAN AND SECURITY VULNERABILITY DATA FOR GENERATING AN INSTANCE LIFESPAN AND SECURITY VULNERABILITY GRAPHIC INCLUDING A GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE VULNERABILITY SCORE FOR THE INSTANCE OPERATION 213, the instance lifespan and security vulnerability data of ANALYZE THE INSTANCE OPERATIONAL DATA TO GENERATE INSTANCE LIFESPAN AND SECURITY VULNERABILITY DATA FOR EACH INSTANCE OPERATION 211 is used to generate instance lifespan and security vulnerability data for each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203 including data for generating an instance lifespan and security vulnerability graphic.

In one embodiment, the instance lifespan and security vulnerability graphic of GENERATE INSTANCE LIFESPAN AND SECURITY VULNERABILITY DATA FOR GENERATING AN INSTANCE LIFESPAN AND SECURITY VULNERABILITY GRAPHIC INCLUDING A GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE VULNERABILITY SCORE FOR THE INSTANCE OPERATION 213 includes an individual graphic representation of each of the one or more instances of OBTAIN ACCESS TO HISTORICAL INSTANCE OPERATIONAL DATA ASSOCIATED WITH ONE OR MORE INSTANCES OPERATING IN A CLOUD COMPUTING ENVIRONMENT TO SERVICE A GIVEN ACCOUNT, EACH OF THE ONE OR MORE INSTANCES BEING CREATED USING ONE OF ONE OR MORE INSTANCE CREATION TEMPLATES OPERATION 203.

In one embodiment, the graphic representation of each of the one or more instances of GENERATE INSTANCE LIFESPAN AND SECURITY VULNERABILITY DATA FOR GENERATING AN INSTANCE LIFESPAN AND SECURITY VULNERABILITY GRAPHIC INCLUDING A GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE VULNERABILITY SCORE FOR THE INSTANCE OPERATION 213 indicates a launch date of the instance, a termination date for the instance, and an indication of the security vulnerability rating or grade assigned to the instance.

Figure 3A:
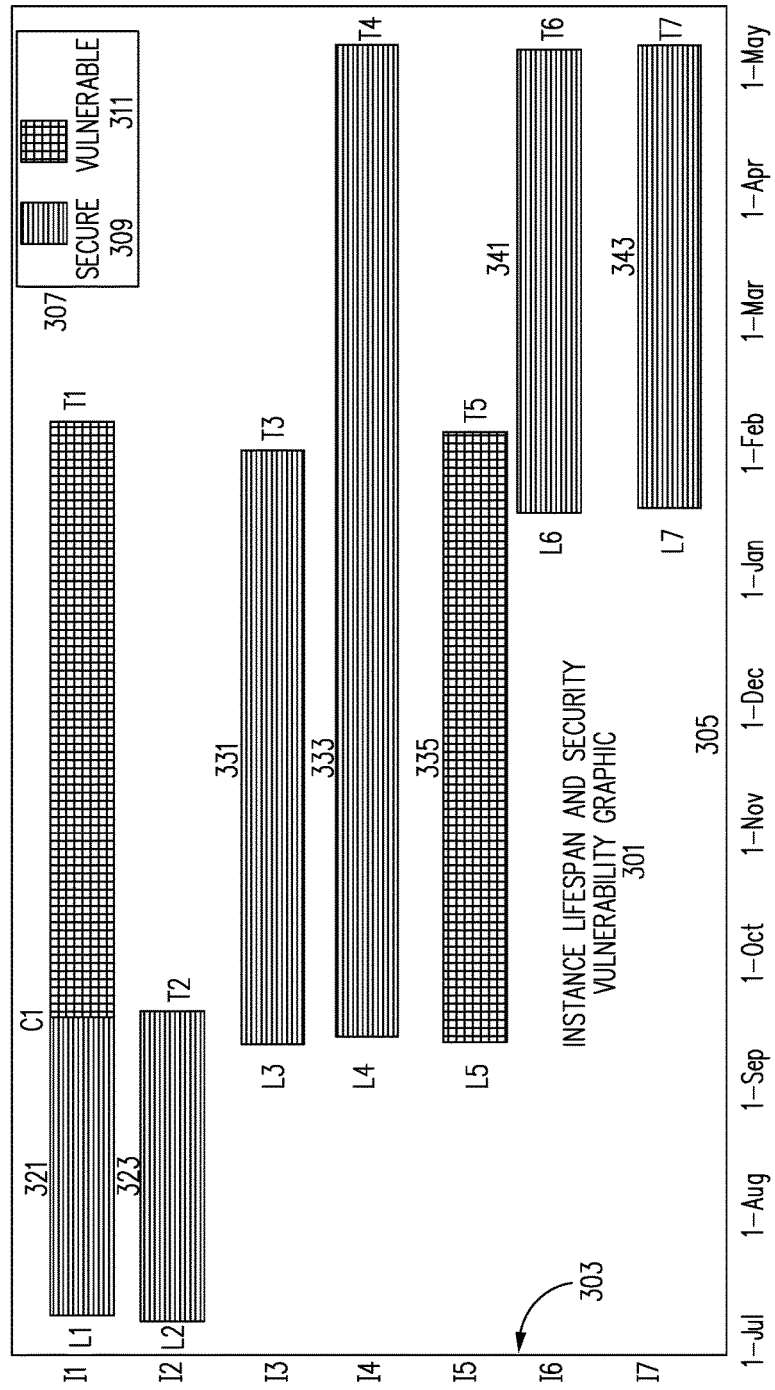
FIG. 3A is a simplified representation of an instance lifespan and security vulnerability graphic in accordance with one embodiment.

FIG. 3A is a simplified representation of an instance lifespan and security vulnerability graphic 301 in accordance with one embodiment. As seen in FIG. 3A, in this specific simplified illustrative example, instance lifespan and security vulnerability graphic 301 includes a listing of instance identification data I1, I2, I3, I4, I5, I6 and I7 associated with each of the one or more instances along a first axis, in this particular example the vertical axis 303, and a date timeline associated with the instance lifespans along a second axis, in this particular example the horizontal axis 305.

As also seen in FIG. 3A, in this specific simplified illustrative example, instance lifespan and security vulnerability graphic 301 includes: each of the one or more instances I1, I2, I3, I4, I5, I6 and I7 represented by an individual instance lifespan graphic 321, 323, 331, 333, 335, 341, and 343, respectively, correlated to the instance identification data listings, I1, I2, I3, I4, I5, I6 and I7, respectively; the launch dates for each instance I1, I2, I3, I4, I5, I6 and I7 of L1, L2, L3, L4, L5, L6, and L7, respectively, correlated to the date timeline of the horizontal axis 305; and the termination dates for each instance I1, I2, I3, I4, I5, I6 and I7 of T1, T2, T3, T4, T5, T6, and T7, respectively, also correlated to the date timeline of the horizontal axis 305.

In addition, as also seen in FIG. 3A, in this specific simplified illustrative example, the security vulnerability score or grade associated with each instance, I1, I2, I3, I4, I5, I6 and I7, is indicated by the fill pattern and color used with the individual instance graphics 321, 323, 331, 333, 335, 341, and 343, respectively. In particular, as seen in table 307 of FIG. 3A, fill pattern and color 309 (green in this specific illustrative example) indicates the instance creation template used to generate the instance, and therefore the instance itself, is considered secure, e.g., has a good security vulnerability score or grade assigned to it. Likewise, as seen in table 307 of FIG. 3A, fill pattern and color 311 (red in this specific illustrative example) indicates the instance creation template used to generate the instance, and therefore the instance itself, is considered vulnerable, e.g., has a poor security vulnerability score or grade assigned to it.

As seen in FIG. 3A, instances I2, I3, I4, I6, and I7 were launched on launch dates L2, L3, L4, L6 and L7, respectively, and terminated on termination dates T2, T3, T4, T6 and T7, respectively. As also seen in FIG. 3A, since each of instances I2, I3, I4, I6, and I7 were analyzed and determined to be secure during their entire lifespans, each of individual instance graphics 323, 331, 333, 341, and 343 include fill pattern and color 309 for their entire length reflecting the assigned good security vulnerability score or grade for their entire lifespans.

As seen in FIG. 3A, instance I2, as represented by individual instance graphic 323, appears to terminate at date T2 at about the same time as instance I3, represented by individual instance graphic 331, is launched at date L3. Likewise, instance I3, as represented by individual instance graphic 331, appears to terminate at date T3 at about the same time as instances I6 and I7, represented by individual instance graphics 341 and 343, are launched at dates L6 and L7, respectively. Consequently, individual instance graphics 323, 331, 341, and 343 exhibit a cascading pattern that the inventors have discovered is indicative of a proper re-stacking policy based on the release of new instance creation templates. In addition, since each of individual instance graphics 323, 331, 341, and 343 include only fill pattern and color 309, this set of cascading individual instance graphics 323, 331, 341, and 343 also indicate excellent security vulnerability minimization is associated with these re-stacking policies.

As also seen in FIG. 3A, instance I4, as represented by individual instance graphic 333, appears to launch at date L4 which, like launch date L3 for instance I3, is at about the same time as instance I2, represented by individual instance graphic 323, is terminated at date T2. However, unlike instance I3, instance I4 has a termination date T4, well past the launch dates L6 and L7 of instances I6 and I7. Consequently, instance I4, as represented by individual instance graphic 333, is not included in a strict cascaded re-stacking like instances I2, I3, I6, and I7 as discussed above. However, as seen in FIG. 3A, individual instance graphic 333 is none the less shown only with fill pattern and color 309. Consequently, it is assumed that the instance creation template used to generate instance I4 has continued to receive a good security vulnerability score or grade even after the release of newer instance creation templates. Consequently, individual instance graphic 333 also indicates excellent security vulnerability minimization.

In one embodiment, the instance creation templates used to generate instances are repeatedly analyzed and tested over time, particularly when a new instance creation template is released. Consequently, the security vulnerability score or grade associated with a given instance can change over time, sometimes simply based on the age of the instance creation template. This is represented in FIG. 3A by a change in fill pattern and color over time.

As a specific illustrative example, as seen in FIG. 3A, instance I1 has a good security vulnerability score or grade associated with it from launch date L1, around July 5, to change date C1, around September 15. Consequently, from launch date L1 to change date C1, the individual instance graphic 321 for instance I1 includes fill pattern and color 309 reflecting the assigned good security vulnerability score or grade for that timeframe. However, at change date C1, instance I1 was apparently analyzed and scored poorly. Consequently, from change date C1 to termination date T1 the graphic visualization 321 for instance I1 includes fill pattern and color 311 reflecting the assigned poor security vulnerability score or grade for that timeframe. As a result, individual instance graphic 321 also indicates a less than ideal security vulnerability minimization after date C1.

In addition, some instances are generated on old, non-current, instance creation templates that are outdated and vulnerable. Consequently, any instance generated by these outdated instance creation templates are considered vulnerable from the date they are launched. Similarly, some instances are generated on faulty instance creation templates and are therefore also considered vulnerable from the date they are launched.

As a specific illustrative example, in FIG. 3A, instance I5 is apparently based on an instance creation template that was either old at the time instance I5 was launched at date L5, or was never very secure. Consequently, from launch date L5 to termination date T5, the individual instance graphic 335 for instance I5 includes only fill pattern and color 311 reflecting the assigned poor security vulnerability score or grade for its entire lifespan. As a result, individual instance graphic 331 also indicates a less than ideal security vulnerability minimization after date L5.

As seen above, instance lifespan and security vulnerability graphic 301 conveys information regarding, how many instances are associated with an account, the identification data for those instances, the launch dates for the instances, the termination dates for the instances, and the security vulnerability score or grade associated with the instances, all in a single, easily interpreted graphic display.

It is worth noting that while a fill pattern and color for each of the individual instance lifespan graphics 321, 323, 331, 333, 335, 341, and 343, i.e., the fill patterns 309 and 311, was used in the example of FIG. 3A to indicate the security vulnerability score or grade associated with each instance, I1, I2, I3, I4, I5, I6 and I7, in other embodiments, other visual features of the individual instance lifespan graphics associated with each of the one or more instances can be used to indicate the security vulnerability score or grade associated with each instance.

For instance, as another specific illustrative example, in one embodiment, only a fill color of the individual instance lifespan graphics associated with each of the one or more instances can be used to indicate the security vulnerability score or grade associated with each instance.

Likewise, as another specific illustrative example, in one embodiment, only a fill pattern of the individual instance lifespan graphics associated with each of the one or more instances can be used to indicate the security vulnerability score or grade associated with each instance.

As another specific illustrative example, in one embodiment, a shape of the individual instance lifespan graphics associated with each of the one or more instances can be used to indicate the security vulnerability score or grade associated with each instance.

In various other embodiments, any visual feature of the individual instance lifespan graphics associated with each of the one or more instances can be used to indicate the security vulnerability score or grade associated with each instance.

In one embodiment, once the instance lifespan and security vulnerability data is used to generate instance lifespan and security vulnerability data for each of the one or more instances, including data for generating an instance lifespan and security vulnerability graphic at GENERATE INSTANCE LIFESPAN AND SECURITY VULNERABILITY DATA FOR GENERATING AN INSTANCE LIFESPAN AND SECURITY VULNERABILITY GRAPHIC INCLUDING A GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE VULNERABILITY SCORE FOR THE INSTANCE OPERATION 213, process flow proceeds to OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 215.

In one embodiment, at OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 215, access to base instance creation template release date data indicating a release date for each base instance creation template associated with the one or more instances is obtained.

In one embodiment, the base instance creation template release date data is obtained at OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 215 from operational log data maintained by the cloud computing environment provider. In one embodiment, the base instance creation template release date data is obtained from the AWS Cloud Trail Service.

In one embodiment, once access to base instance creation template release date data indicating a release date for each base instance creation template associated with the one or more instances is obtained at OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 215, process flow proceeds to USE THE BASE INSTANCE CREATION TEMPLATE RELEASE DATE DATA TO TRANSFORM THE INSTANCE LIFESPAN AND SECURITY VULNERABILITY GRAPHIC INTO A RE-STACKING AND SECURITY VULNERABILITY DATA GRAPHIC INDICATING A LAUNCH DATE AND A TERMINATION DATE FOR EACH INSTANCE, AN INDICATION OF THE INSTANCE VULNERABILITY SCORE FOR THE INSTANCE, AND THE BASE INSTANCE CREATION TEMPLATE RELEASE DATES FOR EACH OF THE BASE INSTANCE CREATION TEMPLATES OPERATION 217.

In one embodiment, at USE THE BASE INSTANCE CREATION TEMPLATE RELEASE DATE DATA TO TRANSFORM THE INSTANCE LIFESPAN AND SECURITY VULNERABILITY GRAPHIC INTO A RE-STACKING AND SECURITY VULNERABILITY DATA GRAPHIC INDICATING A LAUNCH DATE AND A TER- MINATION DATE FOR EACH INSTANCE, AN INDICATION OF THE INSTANCE VULNERABILITY SCORE FOR THE INSTANCE, AND THE BASE INSTANCE CREATION TEMPLATE RELEASE DATES FOR EACH OF THE BASE INSTANCE CREATION TEMPLATES OPERATION 217 the base instance creation template release date data of OBTAIN ACCESS TO BASE INSTANCE CREATION TEMPLATE RELEASE DATE DATA INDICATING A RELEASE DATE FOR EACH BASE INSTANCE CREATION TEMPLATE OPERATION 215 is used to indicate base instance creation template release dates for each of the instance creation templates used to create the one or more instances in the instance lifespan and security vulnerability graphic of GENERATE INSTANCE LIFESPAN AND SECURITY VULNERABILITY DATA FOR GENERATING AN INSTANCE LIFESPAN AND SECURITY VULNERABILITY GRAPHIC INCLUDING A GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE VULNERABILITY SCORE FOR THE INSTANCE OPERATION 213.

In this way, in one embodiment, the instance lifespan and security vulnerability graphic of GENERATE INSTANCE LIFESPAN AND SECURITY VULNERABILITY DATA FOR GENERATING AN INSTANCE LIFESPAN AND SECURITY VULNERABILITY GRAPHIC INCLUDING A GRAPHIC REPRESENTATION OF EACH OF THE ONE OR MORE INSTANCES INDICATING A LAUNCH DATE OF THE INSTANCE, A TERMINATION DATE FOR THE INSTANCE, AND AN INDICATION OF THE INSTANCE VULNERABILITY SCORE FOR THE INSTANCE OPERATION 213 is transformed into a re-stacking and security vulnerability data graphic of USE THE BASE INSTANCE CREATION TEMPLATE RELEASE DATE DATA TO TRANSFORM THE INSTANCE LIFESPAN AND SECURITY VULNERABILITY GRAPHIC INTO A RE-STACKING AND SECURITY VULNERABILITY DATA GRAPHIC INDICATING A LAUNCH DATE AND A TERMINATION DATE FOR EACH INSTANCE, AN INDICATION OF THE INSTANCE VULNERABILITY SCORE FOR THE INSTANCE, AND THE BASE INSTANCE CREATION TEMPLATE RELEASE DATES FOR EACH OF THE BASE INSTANCE CREATION TEMPLATES OPERATION 217.

In accordance with one embodiment, the re-stacking and security vulnerability data graphic of USE THE BASE INSTANCE CREATION TEMPLATE RELEASE DATE DATA TO TRANSFORM THE INSTANCE LIFESPAN AND SECURITY VULNERABILITY GRAPHIC INTO A RE-STACKING AND SECURITY VULNERABILITY DATA GRAPHIC INDICATING A LAUNCH DATE AND A TERMINATION DATE FOR EACH INSTANCE, AN INDICATION OF THE INSTANCE VULNERABILITY SCORE FOR THE INSTANCE, AND THE BASE INSTANCE CREATION TEMPLATE RELEASE DATES FOR EACH OF THE BASE INSTANCE CREATION TEMPLATES OPERATION 217 includes an individual graphic representation of each of the one or more instances indicating a launch date for the instance, a termination date for the instance, an indication of the security vulnerability rating or grade assigned to the instance, and the base instance creation template release dates for each of the base instance creation templates.

Figure 3B:
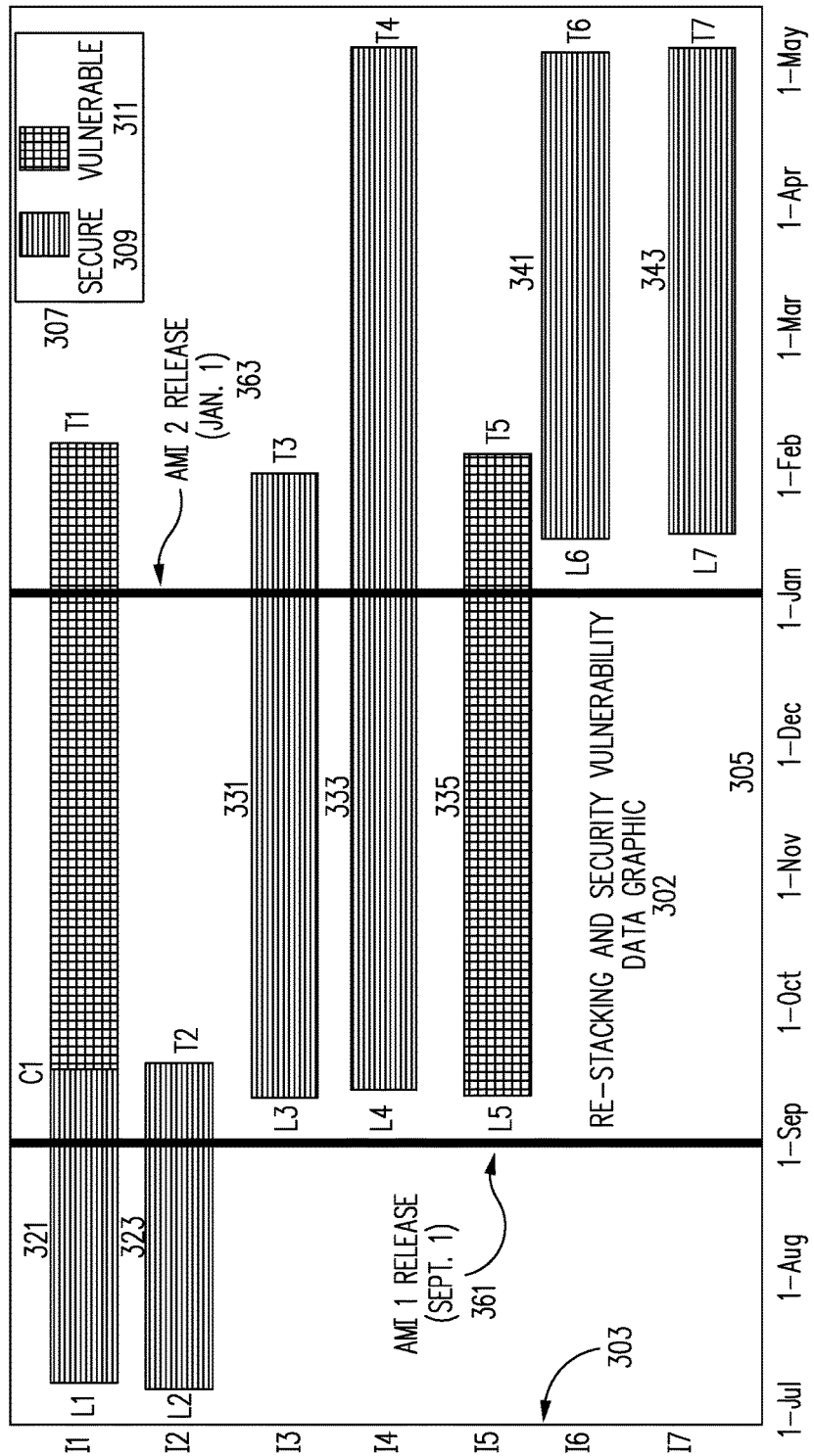
FIG. 3B is a simplified representation of re-stacking and security vulnerability data graphic in accordance with one embodiment.

FIG. 3B is a simplified representation of re-stacking and security vulnerability data graphic 302 in accordance with one embodiment. In this simplified illustrative example, FIG. 3B represents the instance lifespan and security vulnerability graphic 301 of FIG. 3A discussed above, with AMI1 release date visualization 361 of September 1, and AMI2 release date visualization 363 of January 1, the addition of which transforms instance lifespan and security vulnerability graphic 301 of FIG. 3A into re-stacking and security vulnerability data graphic 302 of FIG. 3B.

As noted above, re-stacking and security vulnerability data graphic 302, like instance lifespan and security vulnerability graphic 301, conveys information regarding, how many instances are associated with an account, the identification data for those instances, the launch dates for the instances, the termination dates for the instances, and the security vulnerability score or grade associated with the instances, all in a single, easily interpreted graphic display. However, re-stacking and security vulnerability data graphic 302 also shows this information against the backdrop of AMI1 release date visualization 361 of September 1, and AMI2 release date visualization 363 of January 1. Consequently, re-stacking and security vulnerability data graphic 302 shows individual instance graphics 323, 331, 341, and 343 are a cascading pattern based on the release of new instance creation templates at AMI1 release date visualization 361 of September 1, and AMI2 release date visualization 363 of January 1. In addition, since each of individual instance graphics 323, 331, 341, and 343 include fill pattern and color 309, this set of cascading individual instance graphics 323, 331, 341, and 343 also indicate excellent security vulnerability minimization is associated with these re-stacking policies.

Re-stacking and security vulnerability data graphic 302 also conveys that the instance creation template used to generate instance I4 has continued to receive a good security vulnerability score or grade even after the release of newer instance creation templates at AMI2 release date visualization 363 of January 1. Consequently, individual instance graphic 333 also indicates excellent security vulnerability minimization is associated with these re-stacking policies.

Re-stacking and security vulnerability data graphic 302 also conveys that at change date C1 instance I1 was apparently analyzed and scored poorly after AMI1 release date visualization 361 of September 1. Consequently, from date C1, shortly after AMI1 release date visualization 361 of September 1, to termination date T1 the graphic visualization 321 for instance I1 includes fill pattern and color 311 reflecting the assigned poor security vulnerability score or grade for that timeframe. As a result, individual instance graphic 321 indicates a less than ideal security vulnerability minimization after date C1.

Re-stacking and security vulnerability data graphic 302 also indicates that instance I5 is apparently based on an instance creation template that was either old at the time instance I5 was launched at date L5, after AMI1 release date visualization 361 of September 1, or was never very secure. Consequently, from launch date L5 to termination date T5, the individual instance graphic 335 for instance I5 includes fill pattern and color 311 reflecting the assigned poor security vulnerability score or grade for its entire lifespan. As a result, individual instance graphic 331 also indicates a less than ideal security vulnerability minimization is associated with these re-stacking policies after date L5.

As seen in FIG. 3B, AMI1 release date visualization 361 and AMI2 release date visualization 363 are a visual vertical line representation of the base instance creation template release dates of September 1 and January 1, respectively, correlated to the date timeline of the horizontal axis 305.

However, in various other embodiments, one or more base instance creation template release dates are included in the re-stacking and security vulnerability data graphic as any visual representation of the base instance creation template release dates correlated to the date timeline axis.

Figure 4:
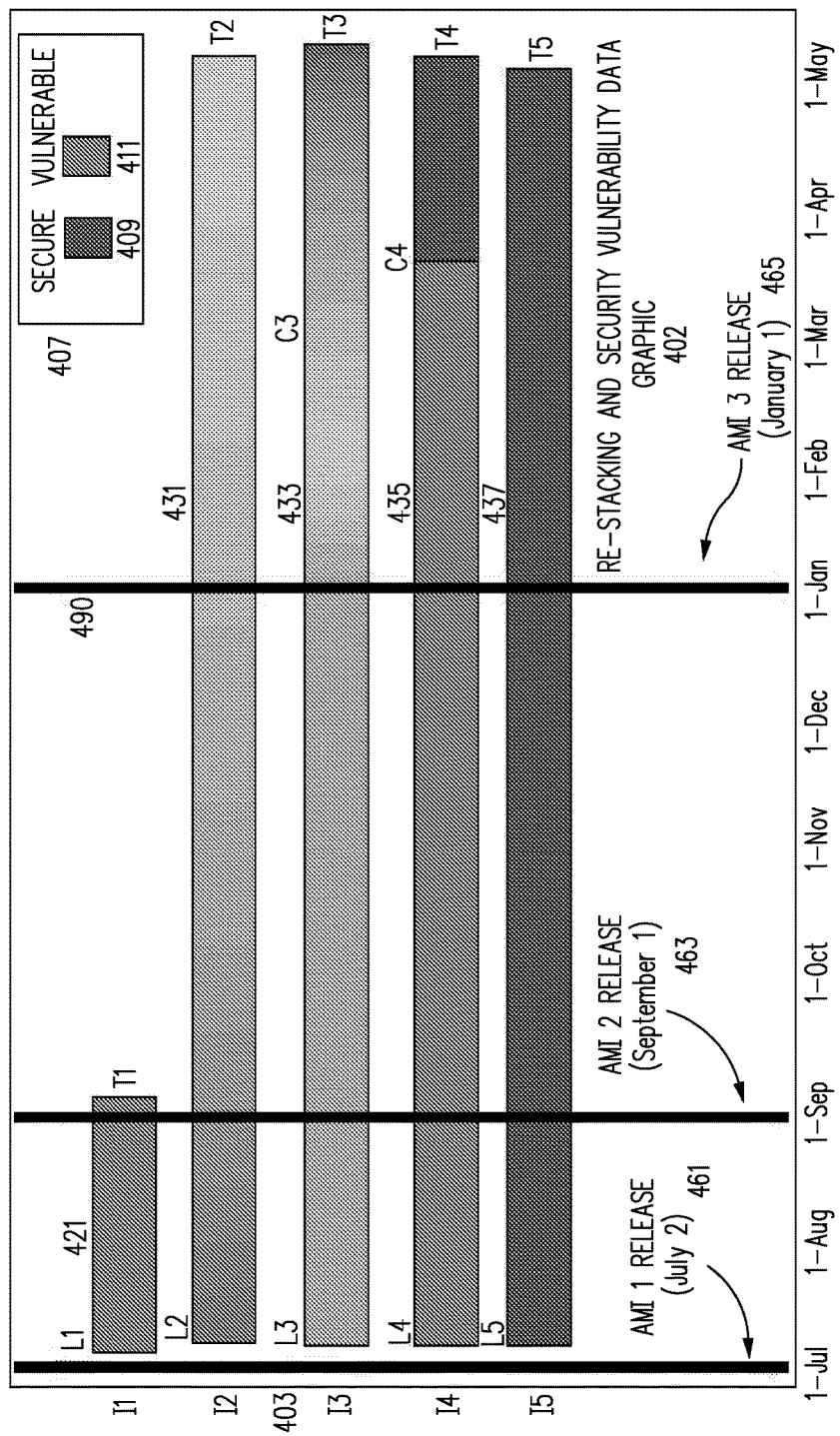
FIG. 4 is a simplified representation of re-stacking and security vulnerability data graphic in accordance with one embodiment.

FIG. 4 is a simplified illustrative example of another re-stacking and security vulnerability data graphic generated at USE THE BASE INSTANCE CREATION TEMPLATE RELEASE DATE DATA TO TRANSFORM THE INSTANCE LIFESPAN AND SECURITY VULNERABILITY GRAPHIC INTO A RE-STACKING AND SECURITY VULNERABILITY DATA GRAPHIC INDICATING A LAUNCH DATE AND A TERMINATION DATE FOR EACH INSTANCE, AN INDICATION OF THE INSTANCE VULNERABILITY SCORE FOR THE INSTANCE, AND THE BASE INSTANCE CREATION TEMPLATE RELEASE DATES FOR EACH OF THE BASE INSTANCE CREATION TEMPLATES OPERATION 217.

As seen in FIG. 4, in this specific simplified illustrative example, re-stacking and security vulnerability data graphic 402 includes a listing of instance identification data I1, I2, I3, I4, and I5 associated with each of the one or more instances along a first axis, in this particular example the vertical axis 403, and a date timeline associated with the instance lifespans along a second axis, in this particular example the horizontal axis 405.

As also seen in FIG. 4, in this specific simplified illustrative example, re-stacking and security vulnerability data graphic 402 includes: each of the one or more instances I1, I2, I3, I4, and I5, represented by an instance lifespan graphic 421, 431, 433, 435, and 437 correlated to the instance identification data listings I1, I2, I3, I4, and I5, respectively; the launch dates for each instance I1, I2, I3, I4, and I5, of L1, L2, L3, L4, and L5, respectively, correlated to the date timeline of the horizontal axis 405; and the termination dates for each instance I1, I2, I3, I4, and I5, of T1, T2, T3, T4, and T5, respectively, also correlated to the date timeline of the horizontal axis 405.

As also seen in FIG. 4, in this specific simplified illustrative example, the security vulnerability score or grade associated with each instance, I1, I2, I3, I4, and I5 is indicated by the fill color used with the individual instance graphics 421, 431, 433, 435, and 437, respectively. In particular, as seen in table 407 of FIG. 4, fill color 409 (green in this specific illustrative example) indicates the instance creation template used to generate the instance, and therefore the instance itself, is considered secure, e.g., has a good security vulnerability score or grade assigned to it. Likewise, as seen in table 407 of FIG. 4, fill color 411 (red in this specific illustrative example) indicates the instance creation template used to generate the instance, and therefore the instance itself, is considered vulnerable, e.g., has a poor security vulnerability score or grade assigned to it.

As also seen in FIG. 4, fill color 409 can be faded/transitioned from dark green, indicating a very good security vulnerability score or grade, to lighter shades of green, indicating progressively less good security vulnerability scores or grades. Likewise, as also seen in FIG. 4, fill color 411 can be faded/transitioned from dark red, indicating a very poor security vulnerability score or grade, to lighter shades of red, indicating progressively less poor security vulnerability scores or grades. Consequently, in the specific illustrative example of FIG. 4, a spectrum of security vulnerability scores ranging from very poor to very good can be represented by a color spectrum ranging from dark green (very good) to lighter shades of green (progressively less good), to light red (slightly poor) to darker shades of red (progressively poorer) to dark red (very poor).

As also seen in FIG. 4, re-stacking and security vulnerability data graphic 402 includes AMI1 release date visualization 461 of July 2; AMI2 release date visualization 463 of September 1; and AMI3 release date visualization 465 of January 1. Consequently, re-stacking and security vulnerability data graphic 402 shows that in response to the release of AMI1 on July 2, instances I1, I2, I3, I4 and I5 were all generated on launch dates L1, L2, L3, L4, and L5, respectively that were after the AMI1 release date of July 2.

In addition, as seen in FIG. 4, only instance I1 was terminated in response to a new AMI release date, AMI2 release date visualization 463 of September 1. As a result, only instance I1 is of a solid green fill color only.

In contrast, instances I2, I3, I4 and I5 all remained active through AMI2 release date visualization 463 of September 1 and AMI3 release date visualization 465 of January 1. And therefore, represent varying levels of security vulnerability.

Referring to instance I2 and individual instance graphic 431, it can be seen that after the release of AMI2 on AMI2 release date visualization 463 of September 1, the security vulnerability score for instance I2 continues to degrade indicated by the fade from dark green (very good) from launch date L2 to AMI2 release date visualization 463 of September 1, then to very light green (barely good) at termination date T2. Since the fill color for individual instance graphic 431 never changes over to any shade of red, it can be assumed that instance I2 was never a high security risk and perhaps the security vulnerability score for instance I2 was degraded strictly on the basis of elapsed time and the availability of new AMIs, rather than a poor score based on security analysis.

Referring to instance I3 and individual instance graphic 433, it can be seen that the security vulnerability score for instance I3 was never very good, as would be indicated by a dark green fill color, but that after the release of AMI3 on AMI3 release date visualization 465 of September 1, the security vulnerability score for instance I3 crossed over to a red fill at change date C3, indicating a poor security vulnerability score and then continues to degrade as indicated by the fade from light red to dark red from change date C3 date termination date T3.

Referring to instance I4 and individual instance graphic 435, it can be seen that the security vulnerability score for instance I4 was very good, dark green, until shortly after the release of AMI3 on AMI3 release date visualization 465 of September 1, when the security vulnerability score for instance I4 abruptly changed to a dark red fill at change date C4, indicating a very poor security vulnerability score. This type of pattern would be indicative of a new security vulnerability analysis of instance I4 at, or around, date C4, which yielded a very poor vulnerability score for instance I4.

Referring to instance I5, as noted above, some instances are generated on old, non-current, instance creation templates that are outdated and vulnerable. Consequently, any instance generated by these outdated instance creation templates are considered vulnerable from the date they are launched. Similarly, some instances are generated on faulty instance creation templates and are therefore also considered vulnerable from the date they are launched. Instance I5 is apparently one of these instances based on an instance creation template that was either old at the time instance I5 was launched at date L5, or was never very secure. Consequently, from launch date L5 to termination date T5, the individual instance graphic 437 for instance I5 includes a constant dark red fill color reflecting the assigned poor security vulnerability score or grade for its entire lifespan.

Figure 5:
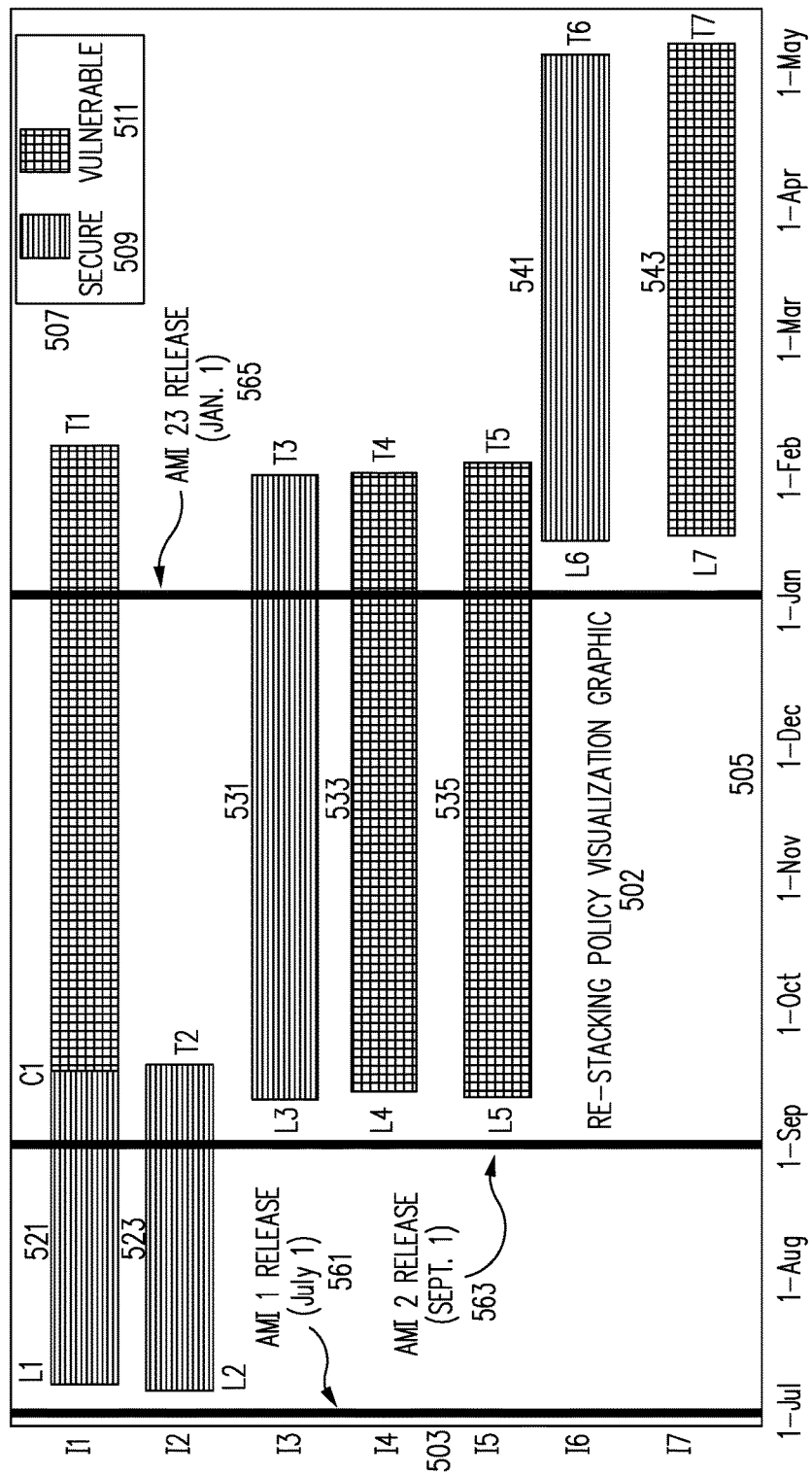
FIG. 5 is a simplified representation of re-stacking and security vulnerability data graphic in accordance with one embodiment.

FIG. 5 is a simplified illustrative example of another re-stacking and security vulnerability data graphic generated at USE THE BASE INSTANCE CREATION TEMPLATE RELEASE DATE DATA TO TRANSFORM THE INSTANCE LIFESPAN AND SECURITY VULNERABILITY GRAPHIC INTO A RE-STACKING AND SECURITY VULNERABILITY DATA GRAPHIC INDICATING A LAUNCH DATE AND A TERMINATION DATE FOR EACH INSTANCE, AN INDICATION OF THE INSTANCE VULNERABILITY SCORE FOR THE INSTANCE, AND THE BASE INSTANCE CREATION TEMPLATE RELEASE DATES FOR EACH OF THE BASE INSTANCE CREATION TEMPLATES OPERATION 217.

As seen in FIG. 5, in this specific simplified illustrative example, re-stacking policy visualization graphic 502 includes a listing of instance identification data I1, I2, I3, I4, I5, I5 and I7 associated with each of the one or more instances along a first axis, in this particular example the vertical axis 503, and a date timeline associated with the instance lifespans along a second axis, in this particular example the horizontal axis 505.

As also seen in FIG. 5, in this specific simplified illustrative example, re-stacking policy visualization graphic 502 includes: each of the one or more instances I1, I2, I3, I4, I5, I5 and I7 represented by an instance lifespan graphic 521, 523, 531, 533, 535, 541, and 543 correlated to the instance identification data listings I1, I2, I3, I4, I5, I5 and I7, respectively; the launch dates for each instance I1, I2, I3, I4, I5, I5 and I7 of L1, L2, L3, L4, L5, L5, and L7, respectively, correlated to the date timeline of the horizontal axis 505; and the termination dates for each instance I1, I2, I3, I4, I5, I5 and I7 of T1, T2, T3, T4, T5, T5, and T7, respectively, also correlated to the date timeline of the horizontal axis 505.

In addition, as also seen in FIG. 5, in this specific simplified illustrative example, the security vulnerability score or grade associated with each instance, I1, I2, I3, I4, I5, I6 and I7, is indicated by the fill pattern and color used with the individual instance graphics 521, 523, 531, 533, 535, 541, and 543 respectively. In particular, as seen in table 507 of FIGS, fill pattern and color 509 (green in this specific illustrative example) indicates the instance creation template used to generate the instance, and therefore the instance itself, is considered secure, e.g., has a good security vulnerability score or grade assigned to it. Likewise, as seen in table 507 of FIGS., fill pattern and color 511 (red in this specific illustrative example) indicates the instance creation template used to generate the instance, and therefore the instance itself, is considered vulnerable, e.g., has a poor security vulnerability score or grade assigned to it.

As also seen in FIG. 5, re-stacking policy visualization graphic 502 includes: AMI1 release date visualization 561 of July 2; AMI2 release date visualization 563 of September 1; and AMI3 release date visualization 565 of January 1.

Re-stacking policy visualization graphic 502 shows that instances I1 and I2 were generated on launch dates L1 and L2, respectively, that were after an initial AMI1 release date of July 2. However, while instance I2 was terminated on termination date T2, shortly after the AMI2 release date of September 1, instance I1 was not terminated until termination date T1 in February of the following year, well after the AMI2 release date of September 1 and the AMI3 release date of January 1.

As seen in FIG. 5, instance I2 appears to have been re-stacked based on the release of a the new AMI2 and therefore individual instance graphic 523 representing instance I2 includes only fill pattern and color 509 indicating a good security vulnerability score from its launch date L1 to t is termination date T1. In contrast, Instance I1 was not re-stacked after the AMI2 release date of September 1 and therefore represents a potential vulnerability after change date C1. This is indicated by the change in the fill pattern and color in individual instance graphic 521 from 509 to 511 at change date C1, shortly after the AMI2 release date of September 1.

Re-stacking policy visualization graphic 502 also shows that in response to the release of AMI2 on September 1, instance I3 was launched on launch date L3, shortly after the release of AMI2 on September 1, presumably to replace instance I1 or I2. As seen in FIG. 5, individual instance graphic 523 includes fill pattern and color 509 indicating a good security vulnerability score throughout its entire lifespan from L3 to T3.

In addition, instances I4 and I5 were launched on launch dates L4 and L5 shortly after the release of AMI2 on September 1. However, instance I4 and I5 were apparently based on an instance creation template that was either old at the time instances I4 and I5 were launched at dates L4 and L5, or they were never very secure. Consequently, from launch dates L4 and L5 to termination dates T4 and T5, the individual instance graphics 533 and 535 representing instances I4 and I5 include a fill pattern and color 511 reflecting the assigned poor security vulnerability score or grade for their entire lifespan.

Re-stacking policy visualization graphic 502 also shows that in response to the release of AMI3 on January 1, instance I6 and I7 were launched on launch dates L6 and L7, shortly after the release of AMI3 on January 1. As seen in FIG. 5, individual instance graphic 541 representing instance L6 includes only fill pattern and color 509 indicating a good security vulnerability score throughout its entire lifespan from L6 to T6.

However, in contrast, individual instance graphic 543 representing instance L7 includes only fill pattern and color 511 indicating a poor security vulnerability score throughout its entire lifespan from L7 to T7. Once again it is assumed instance I7, like instances I4 and I5, were apparently based on an instance creation template that was either old at the time instance I7 was launched at date L7, or it was never very secure.

As seen in FIG. 5, instance I2, as represented by individual instance graphic 523, appears to terminate at date T2 at about the same time as instance I3, represented by individual instance graphic 531, is launched at date L3, and shortly after the release of AMI2 on September 1. Likewise, instance I3, as represented by individual instance graphic 531, appears to terminate at date T3 at about the same time as instance I6, represented by individual instance graphic 541, was launched at date L6, and shortly after the release of AMI3 on January 1. Consequently, individual instance graphics 523, 531, and 541 exhibit a cascading pattern that the inventors have discovered is indicative of a proper re-stacking policy based on the release of new instance creation templates. In addition, since each of individual instance graphics 523, 531, and 541 include fill pattern and color 509, this set of cascading individual instance graphics 523, 531, and 541 also indicate excellent security vulnerability minimization is associated with these re-stacking policies.

As seen in FIG. 5, AMI1 release date visualization 561, AMI2 release date visualization 563, and AMI3 release date visualization 565 are visual vertical line representations of the base instance creation template release dates correlated to the date timeline of the horizontal axis 505. However, in various other embodiments, the one or more base instance creation template release dates are included in the re-stacking policy visualization graphic as any visual representation of the base instance creation template release dates correlated to the date timeline axis.

In one embodiment, once the base instance creation template release date data is used to indicate base instance creation template release dates for each of the instance creation templates used to create the one or more instances in the instance lifespan and security vulnerability graphic at USE THE BASE INSTANCE CREATION TEMPLATE RELEASE DATE DATA TO TRANSFORM THE INSTANCE LIFESPAN AND SECURITY VULNERABILITY GRAPHIC INTO A RE-STACKING AND SECURITY VULNERABILITY DATA GRAPHIC INDICATING A LAUNCH DATE AND A TERMINATION DATE FOR EACH INSTANCE, AN INDICATION OF THE INSTANCE VULNERABILITY SCORE FOR THE INSTANCE, AND THE BASE INSTANCE CREATION TEMPLATE RELEASE DATES FOR EACH OF THE BASE INSTANCE CREATION TEMPLATES OPERATION 217, process flow proceeds to PROVIDE THE RE-STACKING AND SECURITY VULNERABILITY DATA GRAPHIC TO ONE OR MORE PARTIES OPERATION 219.

In one embodiment, at PROVIDE THE RE-STACKING AND SECURITY VULNERABILITY DATA GRAPHIC TO ONE OR MORE PARTIES OPERATION 219, the re-stacking and security vulnerability data graphic of USE THE BASE INSTANCE CREATION TEMPLATE RELEASE DATE DATA TO TRANSFORM THE INSTANCE LIFESPAN AND SECURITY VULNERABILITY GRAPHIC INTO A RE-STACKING AND SECURITY VULNERABILITY DATA GRAPHIC INDICATING A LAUNCH DATE AND A TERMINATION DATE FOR EACH INSTANCE, AN INDICATION OF THE INSTANCE VULNERABILITY SCORE FOR THE INSTANCE, AND THE BASE INSTANCE CREATION TEMPLATE RELEASE DATES FOR EACH OF THE BASE INSTANCE CREATION TEMPLATES OPERATION 217 is evaluated and provided to one or more parties.

In accordance with one embodiment, at PROVIDE THE RE-STACKING AND SECURITY VULNERABILITY DATA GRAPHIC TO ONE OR MORE PARTIES OPERATION 219, one or both of the re-stacking and security vulnerability data graphic and the re-stacking and security vulnerability data graphic data of USE THE BASE INSTANCE CREATION TEMPLATE RELEASE DATE DATA TO TRANSFORM THE INSTANCE LIFESPAN AND SECURITY VULNERABILITY GRAPHIC INTO A RE-STACKING AND SECURITY VULNERABILITY DATA GRAPHIC INDICATING A LAUNCH DATE AND A TERMINATION DATE FOR EACH INSTANCE, AN INDICATION OF THE INSTANCE VULNERABILITY SCORE FOR THE INSTANCE, AND THE BASE INSTANCE CREATION TEMPLATE RELEASE DATES FOR EACH OF THE BASE INSTANCE CREATION TEMPLATES OPERATION 217 is further analyzed to identify security vulnerabilities and re-stacking policy analysis and results data is generated.

In one embodiment, at PROVIDE THE RE-STACKING AND SECURITY VULNERABILITY DATA GRAPHIC TO ONE OR MORE PARTIES OPERATION 219 the account owner/provider of the software application is provided the re-stacking policy analysis and results data and/or is informed of the analysis results.

In one embodiment, once the re-stacking and security vulnerability data graphic is evaluated and provided to one or more parties at PROVIDE THE RE-STACKING AND SECURITY VULNERABILITY DATA GRAPHIC TO ONE OR MORE PARTIES OPERATION 219, process flow proceeds to EXIT OPERATION 230.

In one embodiment, at EXIT OPERATION 230, process 200 for providing instance re-stacking and security ratings data to identify and evaluate re-stacking policies in a cloud computing environment is exited to await new data.

The disclosed embodiments of process 200 for providing instance re-stacking and security ratings data to identify and evaluate re-stacking policies in a cloud computing environment provide an efficient, effective, and highly adaptable solution to the long standing technical need in the cloud computing environment to provide for visualization of re-stacking policies and the security vulnerabilities associated with those re-stacking policies. However, process 200 for providing instance re-stacking and security ratings data to identify and evaluate re-stacking policies in a cloud computing environment does not encompass, embody, or preclude other forms of innovation in the area of cloud computing security and re-stacking analysis.

In addition, process 200 for providing instance re-stacking and security ratings data to identify and evaluate re-stacking policies in a cloud computing environment is not related to any fundamental economic practice, fundamental data processing practice, mental steps, or pen and paper based solution. In fact, the disclosed embodiments of process 200 for providing instance re-stacking and security ratings data to identify and evaluate re-stacking policies in a cloud computing environment are directed to providing solutions to the relatively new problems associated with cloud computing, re-stacking, cloud vulnerability analysis, and the processing and visualization of large amounts of data, i.e., "big data." Consequently, process 200 for providing instance re-stacking and security ratings data to identify and evaluate re-stacking policies in a cloud computing environment is not directed to, does not encompass, and is not merely, an abstract idea or concept.

In addition, process 200 for providing instance re-stacking and security ratings data to identify and evaluate re-stacking policies in a cloud computing environment provides for significant improvements to the technical fields of cloud computing, data security, vulnerability management, and software application implementation. In addition, by allowing for a simple visual analysis of re-stacking policies, and security vulnerabilities associated with those re-stacking policies, process 200 for providing instance re-stacking and security ratings data to identify and evaluate re-stacking policies in a cloud computing environment provides for a more rapid response to security issues and application vulnerabilities, as well as fewer requests for data, data transfers, and data analysis.

Consequently, using process 200 for providing instance re-stacking and security ratings data to identify and evaluate re-stacking policies in a cloud computing environment results in more efficient use of human and non-human resources, fewer processor cycles being utilized, reduced memory utilization, and less communications bandwidth being utilized to relay data to, and from, backend systems and client systems.

As a result, computing systems are transformed into faster, more efficient, and more effective computing systems by process 200 for providing instance re-stacking and security ratings data to identify and evaluate re-stacking policies in a cloud computing environment.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the mechanism and/or process used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "using," "integrating," "generating," "monitoring," "determining," "defining," "designating," "obtaining," "accessing," "analyzing," "obtaining," "identifying," "designating," "categorizing," "receiving," "transmitting," "implementing," "associating," "aggregating," "initiating," "collecting," "creating," "transferring," "storing," "searching," "comparing," "providing," "transforming," "incorporating." "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion, above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for providing instance re-stacking and security ratings data to identify and evaluate re-stacking policies in a cloud computing environment, the method comprising:

obtaining access to historical instance operational data associated with one or more instances operating in a cloud computing environment, each of the one or more instances being created using one of one or more instance creation templates, each of the one or more instances being implemented in connection with an application being offered by an application provider through the cloud computing environment;

identifying one or more instance creation templates used to create the one or more instances;

analyzing each instance creation template of the one or more instance creation templates used to create the one or more instances to determine security vulnerabilities associated with that instance creation template and instances launched based on the instance creation template;

based, at least in part, on the analysis of each instance creation template of the one or more instance creation templates used to create the one or more instances, assigning an instance creation template security vulnerability score to each instance creation template of the one or more instance creation templates used to create the one or more instances;

generating instance creation template security vulnerability score data for each instance creation template and correlating the instance creation template security vulnerability score data for each instance creation template to the instance creation template;

for each of the one or more instances, determining an instance creation template of the one of one or more instance creation templates used to create that instance;

generating instance creation template data for each of the one or more instances, the instance creation template data indicating an instance creation template used to generate each instance of the one or more instances;

for each of the one or more instances, associating the instance creation template data for the instance with that instance;

for each of the one or more instances analyzing the instance creation template data for the instance and assigning the instance vulnerability score associated with the instance creation template used to create the instance to the instance and correlating instance vulnerability score data representing the assigned instance vulnerability score with the instance;

for each of the one or more instances, analyzing the instance operational data associated with the instance to generate instance lifespan and security vulnerability data for the instance, the instance lifespan and security vulnerability data indicating a launch date of the instance, a termination date for the instance, and the instance vulnerability score assigned to the instance;

generating instance lifespan and security vulnerability data, the instance lifespan and security vulnerability data including data for generating an instance lifespan and security vulnerability graphic, the instance lifespan and security vulnerability graphic including a graphic representation of each of the one or more instances, the graphic representation of each of the one or more instances indicating a launch date of the instance, a termination date for the instance, the graphic representation of each of the one or more instances further including an indication of the instance vulnerability score assigned to the instance;

obtaining access to base instance creation template release date data, the base instance creation template release date data indicating a release date for each base instance creation template;

using the base instance creation template release date data to indicate base instance creation template release dates in the instance lifespan and security vulnerability graphic, thereby transforming the instance lifespan and security vulnerability graphic into a re-stacking and security vulnerability data graphic, the re-stacking and security vulnerability data graphic including an individual graphic representation of each of the one or more instances indicating a launch date for the instance, a termination date for the instance, an indication of the instance vulnerability score assigned to the instance, and the base instance creation template release dates for each of the base instance creation templates; and providing the re-stacking and security vulnerability data graphic to one or more parties.

2. The method for providing instance re-stacking and security ratings data to identify and evaluate re-stacking policies in a cloud computing environment of claim 1 wherein historical instance operational data associated with one or more instances is analyzed to:

identify instance identification data associated with each of the one or more instances;

identify image identification data associated with each of the one or more instances;

identify launch time data associated with each of the one or more instances; and identify termination time data associated with each of the one or more instances.

3. The method for providing instance re-stacking and security ratings data to identify and evaluate re-stacking policies in a cloud computing environment of claim 1 wherein the cloud computing environment is an Amazon Web Services (AWS) cloud computing environment and access to historical instance operational data associated with one or more instances is obtained from an AWS Cloud Trail service.

4. The method for providing instance re-stacking and security ratings data to identify and evaluate re-stacking policies in a cloud computing environment of claim 1 wherein the cloud computing environment is an Amazon Web Services (AWS) cloud computing environment and the instance creation templates are Amazon Machine Images (AMIs).

5. The method for providing instance re-stacking and security ratings data to identify and evaluate re-stacking policies in a cloud computing environment of claim 1 wherein the instance lifespan and security vulnerability data for each of the one or more instances includes data indicating a launch date of the instance; data indicating a termination date for the instance; data indicating start times associated with the instance; and data indicating stop times associated with the instance.

6. The method for providing instance re-stacking and security ratings data to identify and evaluate re-stacking policies in a cloud computing environment of claim 1 wherein:

the instance lifespan and security vulnerability graphic includes a listing of instance identification data associated with each of the one or more instances along a first axis and a date timeline associated with the instance lifespans along a second axis, further wherein;

each of the one or more instances in the instance lifespan and security vulnerability graphic is represented by an instance lifespan graphic correlated to the instance identification data listing for that instance on the first axis and the launch date of the instance and the termination date for the instance correlated to the date timeline of the second axis.

7. The method for providing instance re-stacking and security ratings data to identify and evaluate re-stacking policies in a cloud computing environment of claim 1 wherein one or more base instance creation template release dates are included in the re-stacking and security vulnerability data graphic as visual representations of the base instance creation template release dates correlated to the date timeline of the second axis.

8. The method for providing instance re-stacking and security ratings data to identify and evaluate re-stacking policies in a cloud computing environment of claim 1 wherein the one or more base instance creation template release dates are included in the re-stacking and security vulnerability data graphic as visual vertical line representations of the base instance creation template release dates correlated to the date timeline of the second axis.

9. The method for providing instance re-stacking and security ratings data to identify and evaluate re-stacking policies in a cloud computing environment of claim 1 wherein providing the re-stacking and security vulnerability data graphic to one or more parties includes providing the re-stacking and security vulnerability data graphic to one or more of the application provider and a provider of the cloud computing environment.

10. The method for providing instance re-stacking and security ratings data to identify and evaluate re-stacking policies in a cloud computing environment of claim 1 further comprising:
    analyzing the re-stacking and security vulnerability data graphic to determine the re-stacking policy represented by the re-stacking and security vulnerability data graphic;
    determining the effectiveness and security vulnerability of the re-stacking policy;
    generating recommendation data indicating proposed changes to the identified re-stacking policy; and
    providing the recommendation data to the one or more of the application provider and a provider of the cloud computing environment.

11. The method for providing instance re-stacking and security ratings data to identify and evaluate re-stacking policies in a cloud computing environment of claim 6 wherein the instance lifespan graphic associated with each of the one or more instances indicates the instance creation template used to generate that instance.

12. The method for providing instance re-stacking and security ratings data to identify and evaluate re-stacking policies in a cloud computing environment of claim 11 wherein the visual appearance of the instance lifespan graphic associated with each of the one or more instances indicates the instance vulnerability score assigned to the instance.

13. The method for providing instance re-stacking and security ratings data to identify and evaluate re-stacking policies in a cloud computing environment of claim 12 wherein the color of the instance lifespan graphic associated with each of the one or more instances indicates the instance vulnerability score assigned to the instance.

14. The method for providing instance re-stacking and security ratings data to identify and evaluate re-stacking policies in a cloud computing environment of claim 12 wherein the color of the instance lifespan graphic associated with each of the one or more instances indicates the instance vulnerability score assigned to the instance and the color of the instance lifespan graphic associated with each of the one or more instances varies within the instance lifespan graphic as the instance vulnerability score assigned to the instance is updated over the date timeline of the second axis.

15. The method for providing instance re-stacking and security ratings data to identify and evaluate re-stacking policies in a cloud computing environment of claim 12 wherein the shape of the instance lifespan graphic associated with each of the one or more instances indicates the instance vulnerability score assigned to the instance.

16. The method for providing instance re-stacking and security ratings data to identify and evaluate re-stacking policies in a cloud computing environment of claim 12 wherein the shape of the instance lifespan graphic associated with each of the one or more instances indicates the instance vulnerability score assigned to the instance and the shape of the instance lifespan graphic associated with each of the one or more instances varies within the instance lifespan graphic as the instance vulnerability score assigned to the instance is updated over the date timeline of the second axis.

17. A system for providing instance re-stacking and security ratings data to identify and evaluate re-stacking policies in a cloud computing environment, comprising:
    a cloud computing environment;
    one or more instances operating in the cloud computing environment, each of the one or more instances being created using one of one or more instance creation templates, each of the one or more instances being implemented in connection with an application being offered by an application provider through the cloud computing environment;
    an instance creation template identification module for identifying one or more instance creation templates used to create the one or more instances;
    a security vulnerability analysis module for analyzing each instance creation template of the one or more instance creation templates used to create the one or more instances to determine security vulnerabilities associated with that instance creation template and instances launched based on the instance creation template;
    an instance creation template security vulnerability score generation module for assigning an instance creation template security vulnerability score to each instance creation template of the one or more instance creation templates used to create the one or more instances based, at least in part, on the analysis of each instance creation template of the one or more instance creation templates used to create the one or more instances, generating instance creation template security vulnerability score data for each instance creation template, and correlating the instance creation template security vulnerability score data for each instance creation template to the instance creation template;
    a historical instance operational data access module for obtaining access to historical instance operational data associated with the one or more instances operating in the cloud computing environment;
    an instance creation template data generation module for determining an instance creation template of the one of one or more instance creation templates used to create each instance of the one or more instances and generating instance creation template data for each of the one or more instances indicating which instance creation template was used to generate each instance and associating the base instance creation template data for the instance with that instance;
    an instance vulnerability score assignment module for analyzing the instance creation template data each of the one or more instances and assigning the instance vulnerability score associated with the instance creation template used to create the instance to the instance and correlating instance vulnerability score data representing the assigned instance vulnerability score with the instance;

an instance lifespan and security vulnerability data generation module for analyzing the instance operational data associated with each instance of the one or more instances to generate instance lifespan and security vulnerability data for that instance, the instance lifespan and security vulnerability data indicating a launch date of the instance, a termination date for the instance, and the instance vulnerability score assigned to the instance;

an instance lifespan and security vulnerability visualization generation module for generating instance lifespan and security vulnerability data, the instance lifespan and security vulnerability data including data for generating an instance lifespan and security vulnerability graphic, the instance lifespan and security vulnerability graphic including a graphic representation of each of the one or more instances, the graphic representation of each of the one or more instances indicating a launch date of the instance and a termination date for the instance, the graphic representation of each of the one or more instances further including an indication of the instance vulnerability score assigned to the instance;

a base instance creation template release date data generation module for obtaining access to base instance creation template release date data, the base instance creation template release date data indicating a release date for each base instance creation template;

a re-stacking and security vulnerability data graphic generation module for generating a re-stacking and security vulnerability data graphic by using the base instance creation template release date data to indicate base instance creation template release dates in the instance lifespan and security vulnerability graphic, thereby transforming the instance lifespan and security vulnerability graphic into a re-stacking and security vulnerability data graphic, the re-stacking and security vulnerability data graphic including an individual graphic representation of each of the one or more instances indicating a launch date for the instance, a termination date for the instance, an indication of the instance vulnerability score assigned to the instance, and the base instance creation template release dates for each of the base instance creation templates; and a re-stacking and security vulnerability data graphic display module for providing the re-stacking and security vulnerability data graphic to one or more parties on one or more computing systems.

18. The system for providing instance re-stacking and security ratings data to identify and evaluate re-stacking policies in a cloud computing environment of claim 17 wherein historical instance operational data associated with one or more instances is analyzed to:
identify instance identification data associated with each of the one or more instances;
identify image identification data associated with each of the one or more instances;
identify launch time data associated with each of the one or more instances; and
identify termination time data associated with each of the one or more instances.

19. The system for providing instance re-stacking and security ratings data to identify and evaluate re-stacking policies in a cloud computing environment of claim 17 wherein the cloud computing environment is an Amazon Web Services (AWS) cloud computing environment and access to historical instance operational data associated with one or more instances is obtained from an AWS Cloud Trail service.

20. The system for providing instance re-stacking and security ratings data to identify and evaluate re-stacking policies in a cloud computing environment of claim 17 wherein the cloud computing environment is an Amazon Web Services (AWS) cloud computing environment and the instance creation templates are Amazon Machine Images (AMIs).

21. The system for providing instance re-stacking and security ratings data to identify and evaluate re-stacking policies in a cloud computing environment of claim 17 wherein the instance lifespan and security vulnerability data for each of the one or more instances includes data indicating a launch date of the instance; data indicating a termination date for the instance; data indicating start times associated with the instance; and data indicating stop times associated with the instance.

22. The system for providing instance re-stacking and security ratings data to identify and evaluate re-stacking policies in a cloud computing environment of claim 17 wherein:
the instance lifespan and security vulnerability graphic includes a listing of instance identification data associated with each of the one or more instances along a first axis and a date timeline associated with the instance lifespans along a second axis, further wherein;
each of the one or more instances in the instance lifespan and security vulnerability graphic is represented by an instance lifespan graphic correlated to the instance identification data listing for that instance on the first axis and the launch date of the instance and the termination date for the instance correlated to the date timeline of the second axis.

23. The system for providing instance re-stacking and security ratings data to identify and evaluate re-stacking policies in a cloud computing environment of claim 17 wherein the one or more base instance creation template release dates are included in the re-stacking and security vulnerability data graphic as visual vertical line representations of the base instance creation template release dates correlated to the date timeline of the second axis.

24. The system for providing instance re-stacking and security ratings data to identify and evaluate re-stacking policies in a cloud computing environment of claim 17 wherein providing the re-stacking and security vulnerability data graphic to one or more parties includes providing the re-stacking and security vulnerability data graphic to one or more of the application provider and a provider of the cloud computing environment.

25. The system for providing instance re-stacking and security ratings data to identify and evaluate re-stacking policies in a cloud computing environment of claim 17 further comprising:
analyzing the re-stacking and security vulnerability data graphic to determine the re-stacking policy represented by the re-stacking and security vulnerability data graphic;
determining the effectiveness and security vulnerability of the re-stacking policy;

generating recommendation data indicating proposed changes to the identified re-stacking policy; and providing the recommendation data to the one or more of the application provider and a provider of the cloud computing environment.

26. The system for providing instance re-stacking and security ratings data to identify and evaluate re-stacking policies in a cloud computing environment of claim 22 wherein the instance lifespan graphic associated with each of the one or more instances indicates the instance creation template used to generate that instance.

27. The system for providing instance re-stacking and security ratings data to identify and evaluate re-stacking policies in a cloud computing environment of claim 26 wherein the visual appearance of the instance lifespan graphic associated with each of the one or more instances indicates the instance vulnerability score assigned to the instance.

28. The system for providing instance re-stacking and security ratings data to identify and evaluate re-stacking policies in a cloud computing environment of claim 26 wherein the color of the instance lifespan graphic associated with each of the one or more instances indicates the instance vulnerability score assigned to the instance.

29. The system for providing instance re-stacking and security ratings data to identify and evaluate re-stacking policies in a cloud computing environment of claim 26 wherein the color of the instance lifespan graphic associated with each of the one or more instances indicates the instance vulnerability score assigned to the instance and the color of the instance lifespan graphic associated with each of the one or more instances varies within the instance lifespan graphic as the instance vulnerability score assigned to the instance is updated over the date timeline of the second axis.

30. The system for providing instance re-stacking and security ratings data to identify and evaluate re-stacking policies in a cloud computing environment of claim 26 wherein the shape of the instance lifespan graphic associated with each of the one or more instances indicates the instance vulnerability score assigned to the instance.

31. The system for providing instance re-stacking and security ratings data to identify and evaluate re-stacking policies in a cloud computing environment of claim 26 wherein the shape of the instance lifespan graphic associated with each of the one or more instances indicates the instance vulnerability score assigned to the instance and the shape of the instance lifespan graphic associated with each of the one or more instances varies within the instance lifespan graphic as the instance vulnerability score assigned to the instance is updated over the date timeline of the second axis.

32. The system for providing instance re-stacking and security ratings data to identify and evaluate re-stacking policies in a cloud computing environment of claim 17 wherein one or more base instance creation template release dates are included in the re-stacking and security vulnerability data graphic as visual representations of the base instance creation template release dates correlated to the date timeline of the second axis.

33. A computer program product for providing instance re-stacking and security ratings data to identify and evaluate re-stacking policies in a cloud computing environment, the computer program product including machine readable instructions stored in a memory for implementing a process for providing instance re-stacking and security ratings data to identify and evaluate re-stacking policies in a cloud computing environment, the process for providing instance re-stacking and security ratings data to identify and evaluate re-stacking policies in a cloud computing environment comprising:

obtaining access to historical instance operational data associated with one or more instances operating in a cloud computing environment, each of the one or more instances being created using one of one or more instance creation templates, each of the one or more instances being implemented in connection with an application being offered by an application provider through the cloud computing environment;

identifying one or more instance creation templates used to create the one or more instances;

analyzing each instance creation template of the one or more instance creation templates used to create the one or more instances to determine security vulnerabilities associated with that instance creation template and instances launched based on the instance creation template;

based, at least in part, on the analysis of each instance creation template of the one or more instance creation templates used to create the one or more instances, assigning an instance creation template security vulnerability score to each instance creation template of the one or more instance creation templates used to create the one or more instances;

generating instance creation template security vulnerability score data for each instance creation template and correlating the instance creation template security vulnerability score data for each instance creation template to the instance creation template;

for each of the one or more instances, determining an instance creation template of the one of one or more instance creation templates used to create that instance;

generating instance creation template data for each of the one or more instances, the instance creation template data indicating an instance creation template used to generate each instance of the one or more instances;

for each of the one or more instances, associating the instance creation template data for the instance with that instance;

for each of the one or more instances analyzing the instance creation template data for the instance and assigning the instance vulnerability score associated with the instance creation template used to create the instance to the instance and correlating instance vulnerability score data representing the assigned instance vulnerability score with the instance;

for each of the one or more instances, analyzing the instance operational data associated with the instance to generate instance lifespan and security vulnerability data for the instance, the instance lifespan and security vulnerability data indicating a launch date of the instance, a termination date for the instance, and the instance vulnerability score assigned to the instance;

generating instance lifespan and security vulnerability data, the instance lifespan and security vulnerability data including data for generating an instance lifespan and security vulnerability graphic, the instance lifespan and security vulnerability graphic including a graphic representation of each of the one or more instances, the graphic representation of each of the one or more instances indicating a launch date of the instance, a termination date for the instance, the graphic representation of each of the one or more instances further including an indication of the instance vulnerability score assigned to the instance;

obtaining access to base instance creation template release date data, the base instance creation template release date data indicating a release date for each base instance creation template;

using the base instance creation template release date data to indicate base instance creation template release dates in the instance lifespan and security vulnerability graphic, thereby transforming the instance lifespan and security vulnerability graphic into a re-stacking and security vulnerability data graphic, the re-stacking and security vulnerability data graphic including an individual graphic representation of each of the one or more instances indicating a launch date for the instance, a termination date for the instance, an indication of the instance vulnerability score assigned to the instance, and the base instance creation template release dates for each of the base instance creation templates; and providing the re-stacking and security vulnerability data graphic to one or more parties.

34. The computer program product for providing instance re-stacking and security ratings data to identify and evaluate re-stacking policies in a cloud computing environment of claim 33 historical instance operational data associated with one or more instances is analyzed to:
identify instance identification data associated with each of the one or more instances;
identify image identification data associated with each of the one or more instances;
identify launch time data associated with each of the one or more instances; and
identify termination time data associated with each of the one or more instances.

35. The computer program product for providing instance re-stacking and security ratings data to identify and evaluate re-stacking policies in a cloud computing environment of claim 33 wherein the cloud computing environment is an Amazon Web Services (AWS) cloud computing environment and access to historical instance operational data associated with one or more instances is obtained from an AWS Cloud Trail service.

36. The computer program product for providing instance re-stacking and security ratings data to identify and evaluate re-stacking policies in a cloud computing environment of claim 33 wherein the cloud computing environment is an Amazon Web Services (AWS) cloud computing environment and the instance creation templates are Amazon Machine Images (AMIs).

37. The computer program product for providing instance re-stacking and security ratings data to identify and evaluate re-stacking policies in a cloud computing environment of claim 33 wherein the instance lifespan and security vulnerability data for each of the one or more instances includes data indicating a launch date of the instance; data indicating a termination date for the instance; data indicating start times associated with the instance; and data indicating stop times associated with the instance.

38. The computer program product for providing instance re-stacking and security ratings data to identify and evaluate re-stacking policies in a cloud computing environment of claim 33 wherein:
the instance lifespan and security vulnerability graphic includes a listing of instance identification data associated with each of the one or more instances along a first axis and a date timeline associated with the instance lifespans along a second axis, further wherein;
each of the one or more instances in the instance lifespan and security vulnerability graphic is represented by an instance lifespan graphic correlated to the instance identification data listing for that instance on the first axis and the launch date of the instance and the termination date for the instance correlated to the date timeline of the second axis.

39. The computer program product for providing instance re-stacking and security ratings data to identify and evaluate re-stacking policies in a cloud computing environment of claim 33 wherein one or more base instance creation template release dates are included in the re-stacking and security vulnerability data graphic as visual representations of the base instance creation template release dates correlated to the date timeline of the second axis.

40. The computer program product for providing instance re-stacking and security ratings data to identify and evaluate re-stacking policies in a cloud computing environment of claim 33 wherein the one or more base instance creation template release dates are included in the re-stacking and security vulnerability data graphic as visual vertical line representations of the base instance creation template release dates correlated to the date timeline of the second axis.

41. The computer program product for providing instance re-stacking and security ratings data to identify and evaluate re-stacking policies in a cloud computing environment of claim 33 wherein providing the re-stacking and security vulnerability data graphic to one or more parties includes providing the re-stacking and security vulnerability data graphic to one or more of the application provider and a provider of the cloud computing environment.

42. The computer program product for providing instance re-stacking and security ratings data to identify and evaluate re-stacking policies in a cloud computing environment of claim 33 further comprising:
analyzing the re-stacking and security vulnerability data graphic to determine the re-stacking policy represented by the re-stacking and security vulnerability data graphic;
determining the effectiveness and security vulnerability of the re-stacking policy;
generating recommendation data indicating proposed changes to the identified re-stacking policy; and
providing the recommendation data to the one or more of the application provider and a provider of the cloud computing environment.

43. The computer program product for providing instance re-stacking and security ratings data to identify and evaluate re-stacking policies in a cloud computing environment of claim 38 wherein the instance lifespan graphic associated with each of the one or more instances indicates the instance creation template used to generate that instance.

44. The computer program product for providing instance re-stacking and security ratings data to identify and evaluate re-stacking policies in a cloud computing environment of claim 43 wherein the visual appearance of the instance lifespan graphic associated with each of the one or more instances indicates the instance vulnerability score assigned to the instance.

45. The computer program product for providing instance re-stacking and security ratings data to identify and evaluate re-stacking policies in a cloud computing environment of claim 44 wherein the color of the instance lifespan graphic associated with each of the one or more instances indicates the instance vulnerability score assigned to the instance.

46. The computer program product for providing instance re-stacking and security ratings data to identify and evaluate re-stacking policies in a cloud computing environment of claim 44 wherein the color of the instance lifespan graphic associated with each of the one or more instances indicates the instance vulnerability score assigned to the instance and the color of the instance lifespan graphic associated with each of the one or more instances varies within the instance lifespan graphic as the instance vulnerability score assigned to the instance is updated over the date timeline of the second axis.

47. The computer program product for providing instance re-stacking and security ratings data to identify and evaluate re-stacking policies in a cloud computing environment of claim 44 wherein the shape of the instance lifespan graphic associated with each of the one or more instances indicates the instance vulnerability score assigned to the instance.

48. The computer program product for providing instance re-stacking and security ratings data to identify and evaluate re-stacking policies in a cloud computing environment of claim 44 wherein the shape of the instance lifespan graphic associated with each of the one or more instances indicates the instance vulnerability score assigned to the instance and the shape of the instance lifespan graphic associated with each of the one or more instances varies within the instance lifespan graphic as the instance vulnerability score assigned to the instance is updated over the date timeline of the second axis.

* * * * *